US009691235B2

(12) United States Patent
Kamiwano

(10) Patent No.: US 9,691,235 B2
(45) Date of Patent: Jun. 27, 2017

(54) COMMUNICATION APPARATUS AND METHOD FOR CONTROLLING THE SAME

(71) Applicant: CANON KABUSHIKI KAISHA, Tokyo (JP)

(72) Inventor: Daisuke Kamiwano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/234,394

(22) Filed: Aug. 11, 2016

(65) Prior Publication Data
US 2017/0053501 A1 Feb. 23, 2017

(30) Foreign Application Priority Data

Aug. 21, 2015 (JP) ................................. 2015-164179

(51) Int. Cl.
G08B 5/22 (2006.01)
G06F 21/44 (2013.01)
H01M 10/48 (2006.01)
H04W 12/06 (2009.01)
H01M 10/42 (2006.01)
H04W 4/00 (2009.01)
H04W 84/12 (2009.01)

(52) U.S. Cl.
CPC ............ G08B 5/225 (2013.01); G06F 21/44 (2013.01); G06F 2221/2129 (2013.01); H01M 10/488 (2013.01); H01M 2010/4278 (2013.01); H04W 4/008 (2013.01); H04W 12/06 (2013.01); H04W 84/12 (2013.01)

(58) Field of Classification Search
CPC G08B 5/225; H02J 7/0004; H02J 2007/0001; H02J 2007/0098; G06F 21/44
See application file for complete search history.

(56) References Cited

U.S. PATENT DOCUMENTS

2008/0252477 A1  10/2008  Howard
2009/0256717 A1  10/2009  Iwai
2009/0292918 A1* 11/2009  Mori ...................... G06F 21/31
                                                    713/168

FOREIGN PATENT DOCUMENTS

JP    2008-141555 A    6/2008
JP    2009-203641 A    9/2009
JP    2012-128548 A    7/2012

OTHER PUBLICATIONS

Anonymous:"ORIGA SLE95200 Original product authentication and brand protection solution",Feb. 22, 2012, XP055319299,Retrieved from the Internet:URL:http://www.infineon.com/dgdl/ORIGA2_SLE95200_Product_Brief v1+00.pdf?fileld=db3a30433580b3710135a50170336cd8 [retrieved on Nov. 14, 2016].

(Continued)

Primary Examiner — Curtis Odom
(74) Attorney, Agent, or Firm — Cowan, Liebowitz & Latman, P.C.

(57) ABSTRACT

A communication apparatus that can be driven with a battery includes: an authentication unit arranged to authenticate a battery attached to the communication apparatus; and a wireless communication unit arranged to communicate with an external apparatus via a wireless network. The wireless communication unit of the communication apparatus is arranged to output a result of authentication by the authentication unit to the external apparatus via the wireless network.

12 Claims, 22 Drawing Sheets

(56) References Cited

OTHER PUBLICATIONS

The above documents were cited in a European Search Report issued on Nov. 24, 2016, that issued in the corresponding European Patent Application No. 16184671.2.

* cited by examiner

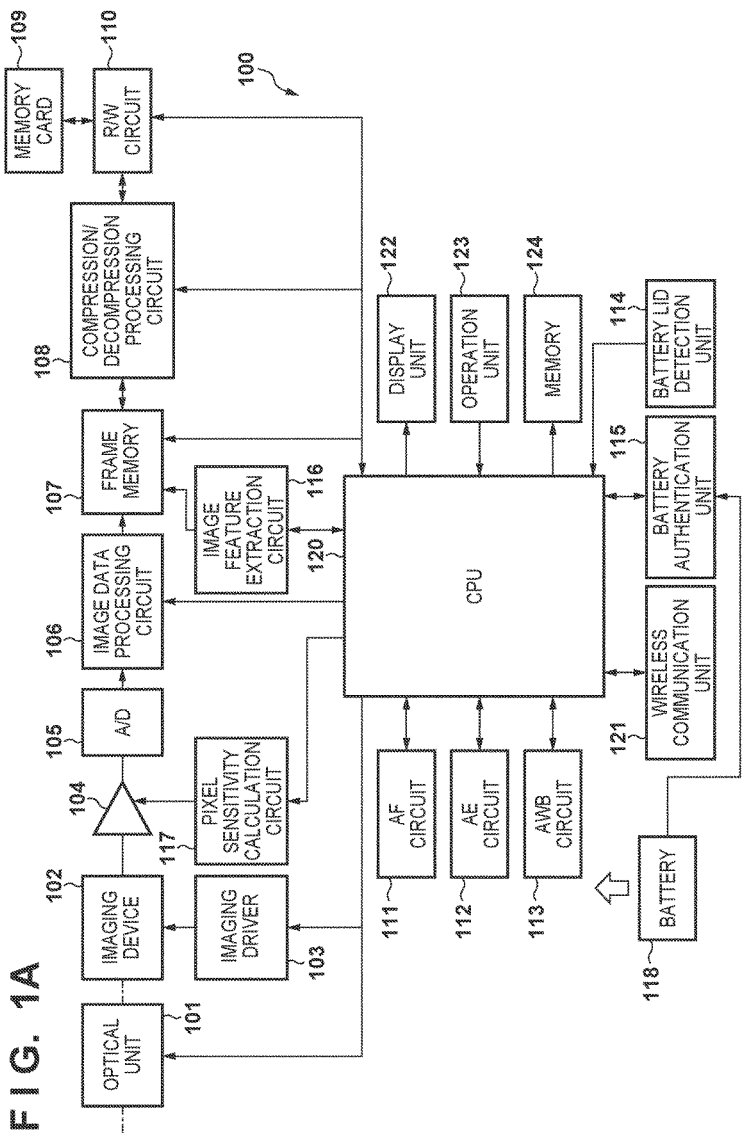

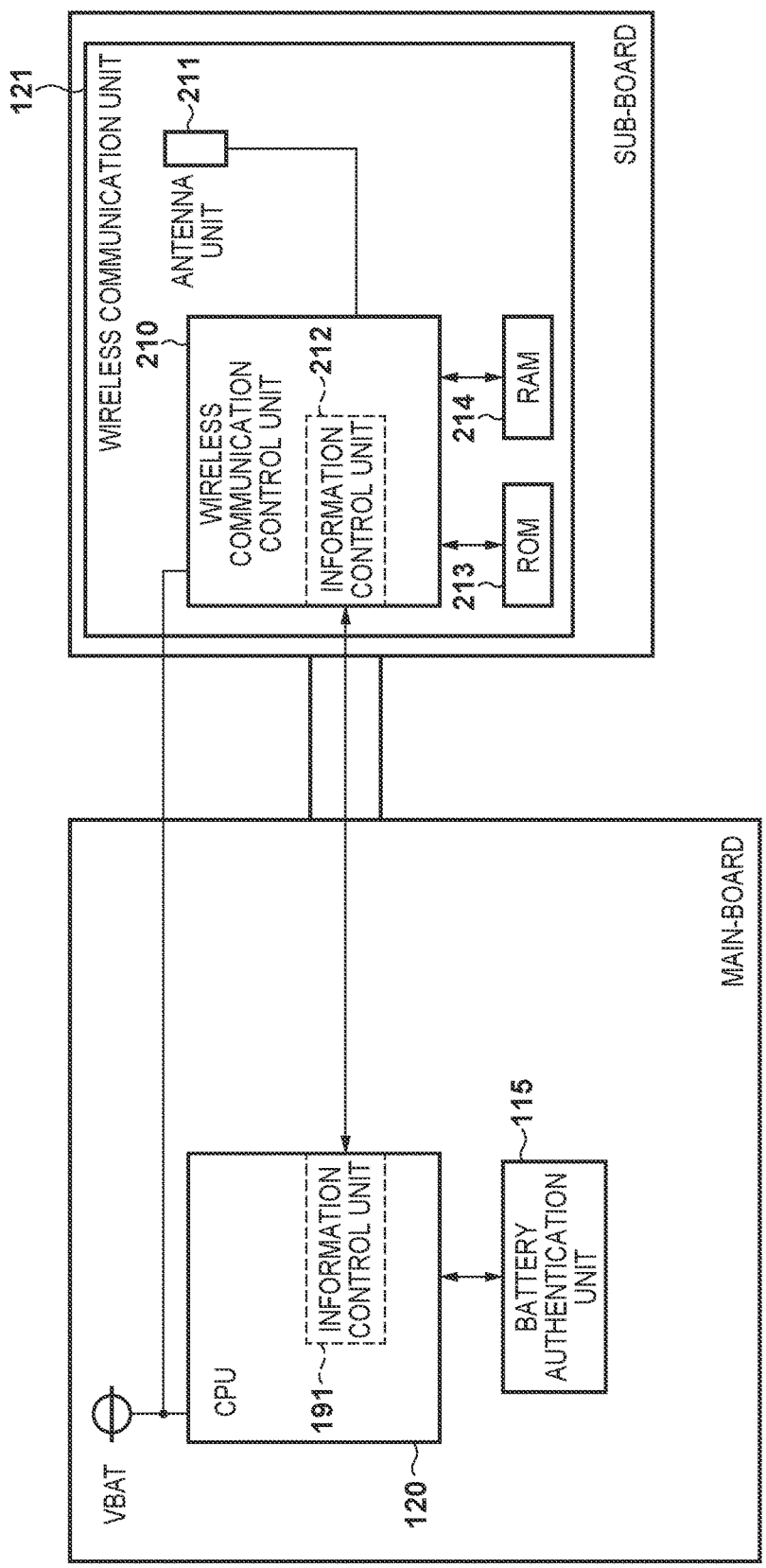

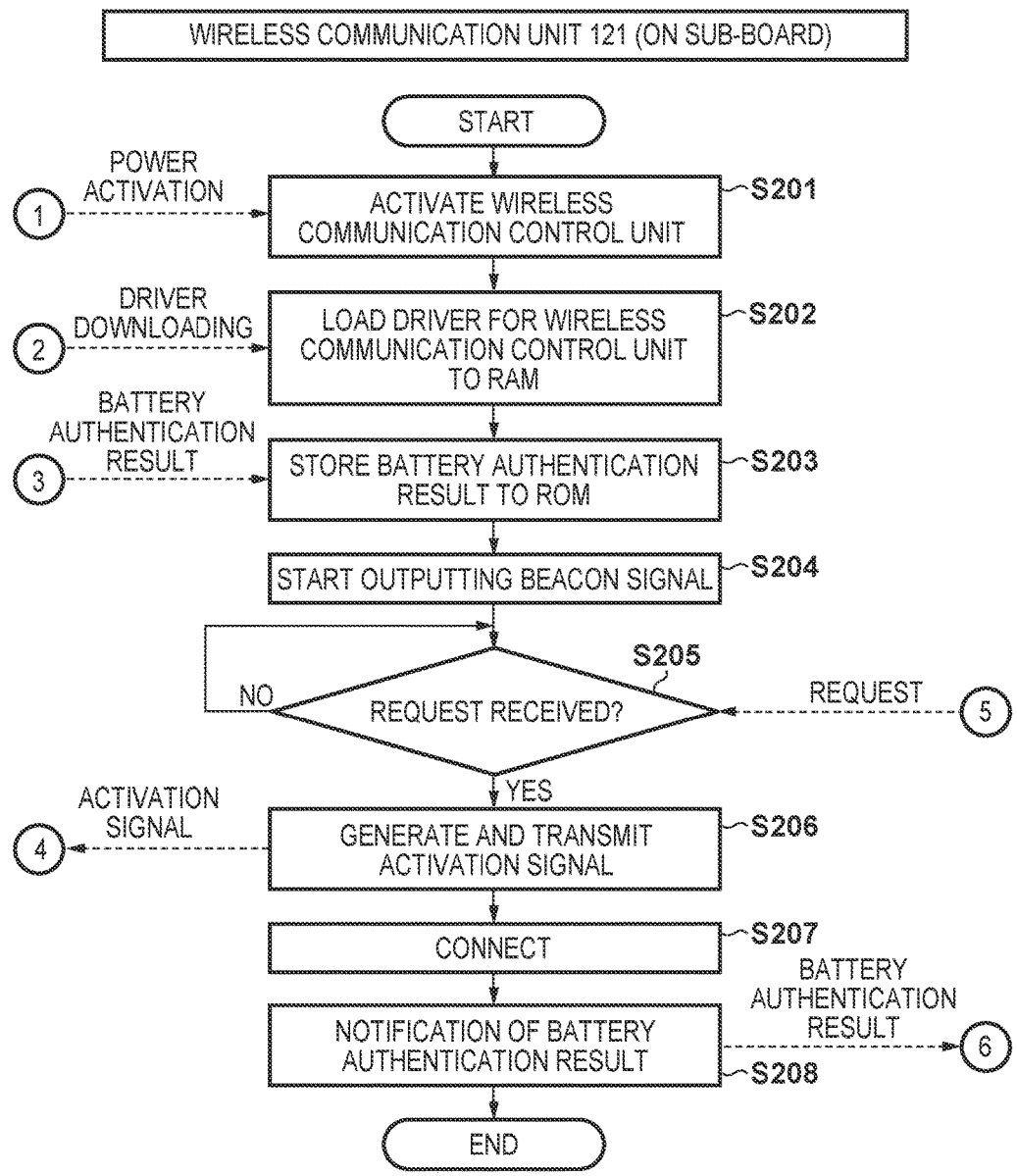

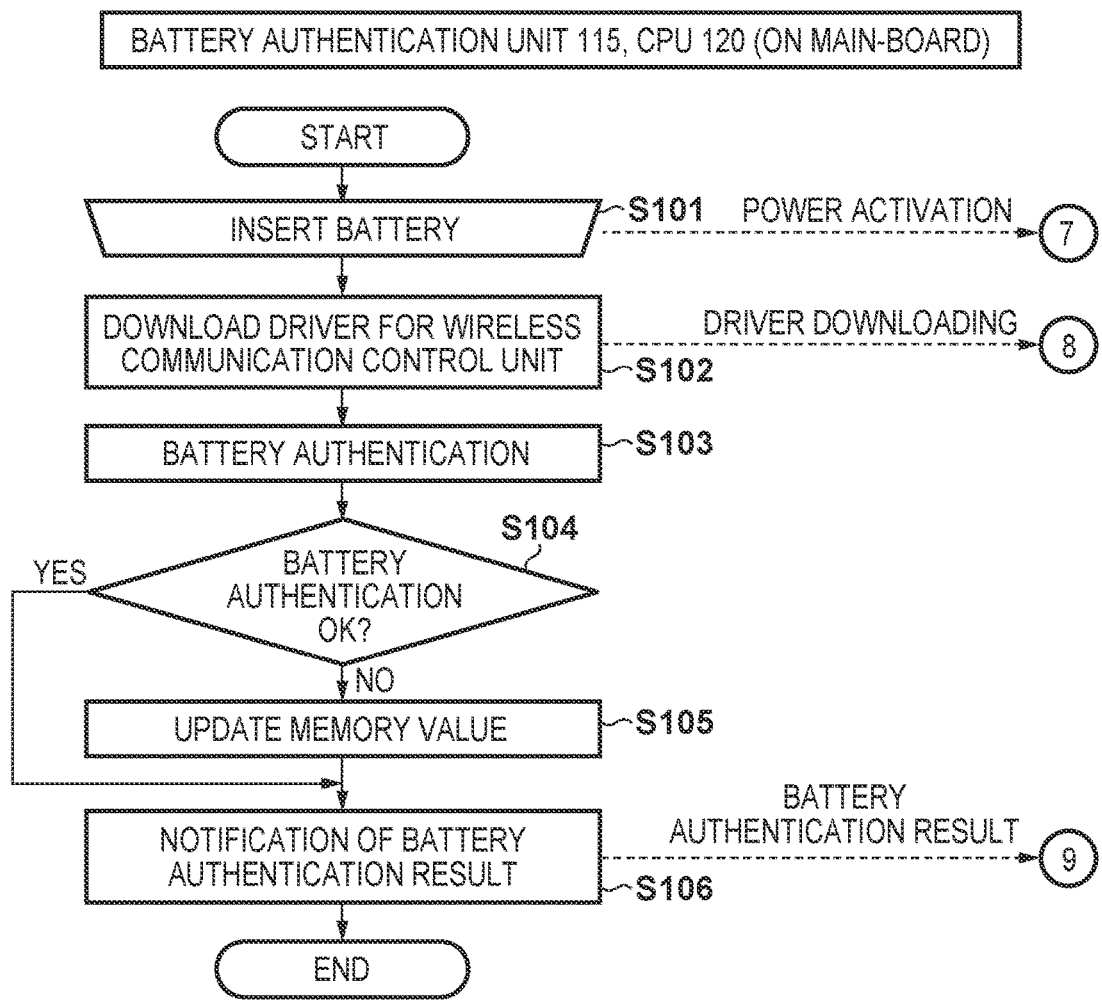

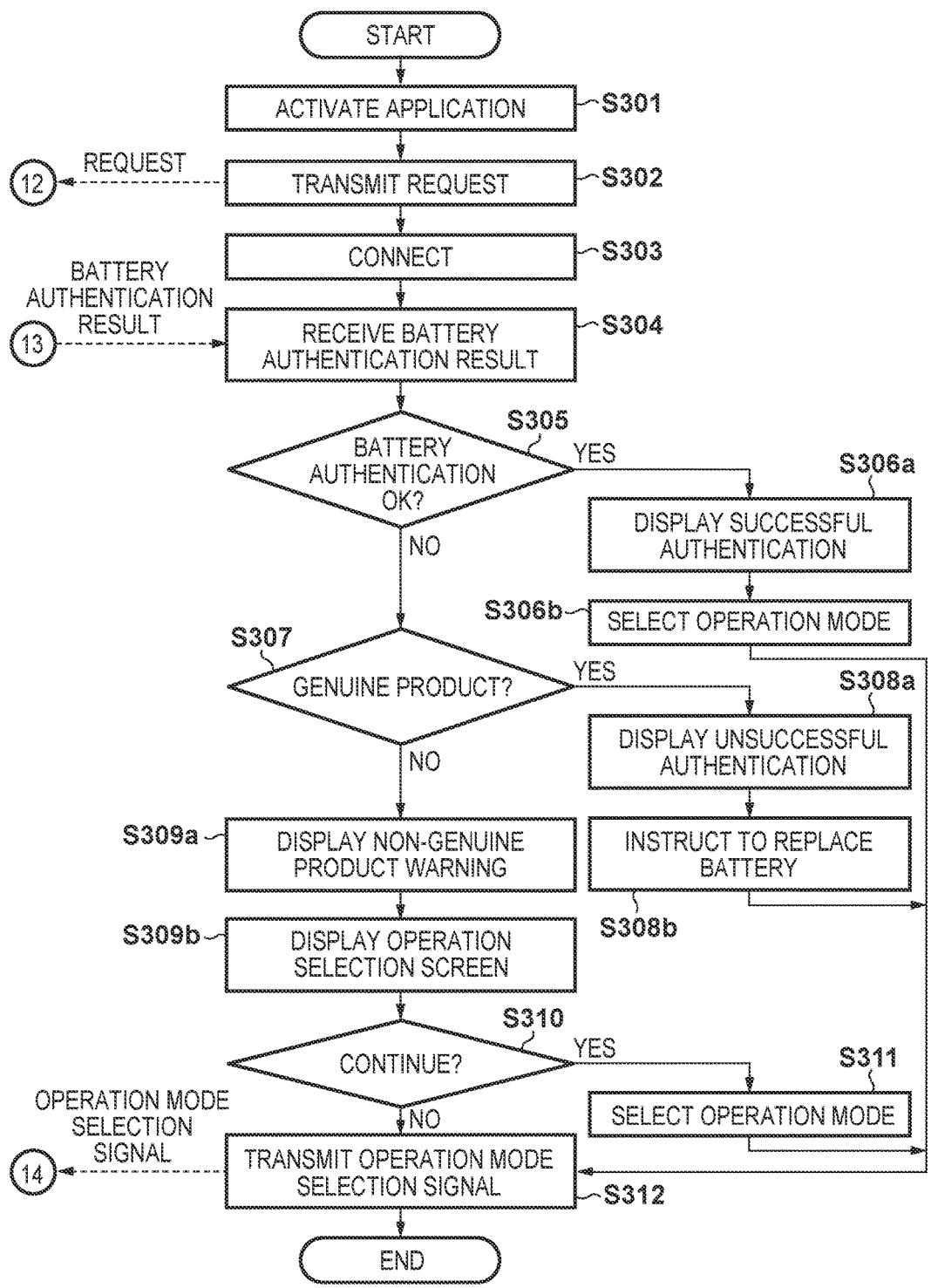

FIG. 7A
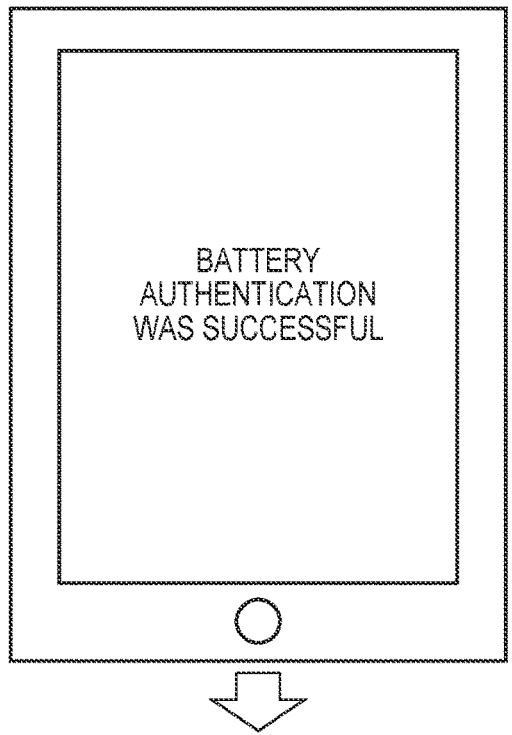
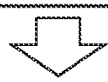
FIG. 7B
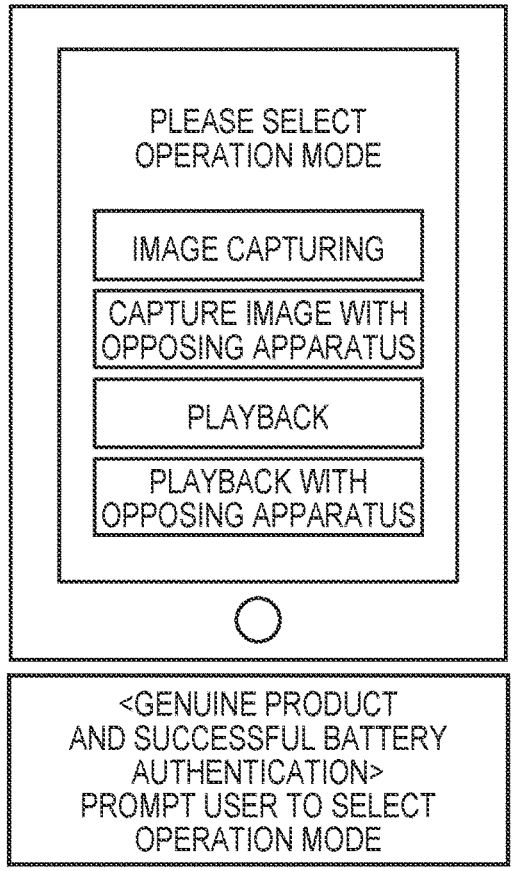

BATTERY
AUTHENTICATION FAILED

PLEASE REPLACE
BATTERY

<GENUINE PRODUCT
AND UNSUCCESSFUL BATTERY
AUTHENTICATION>
NOTIFY USER OF NEED TO
REPLACE BATTERY

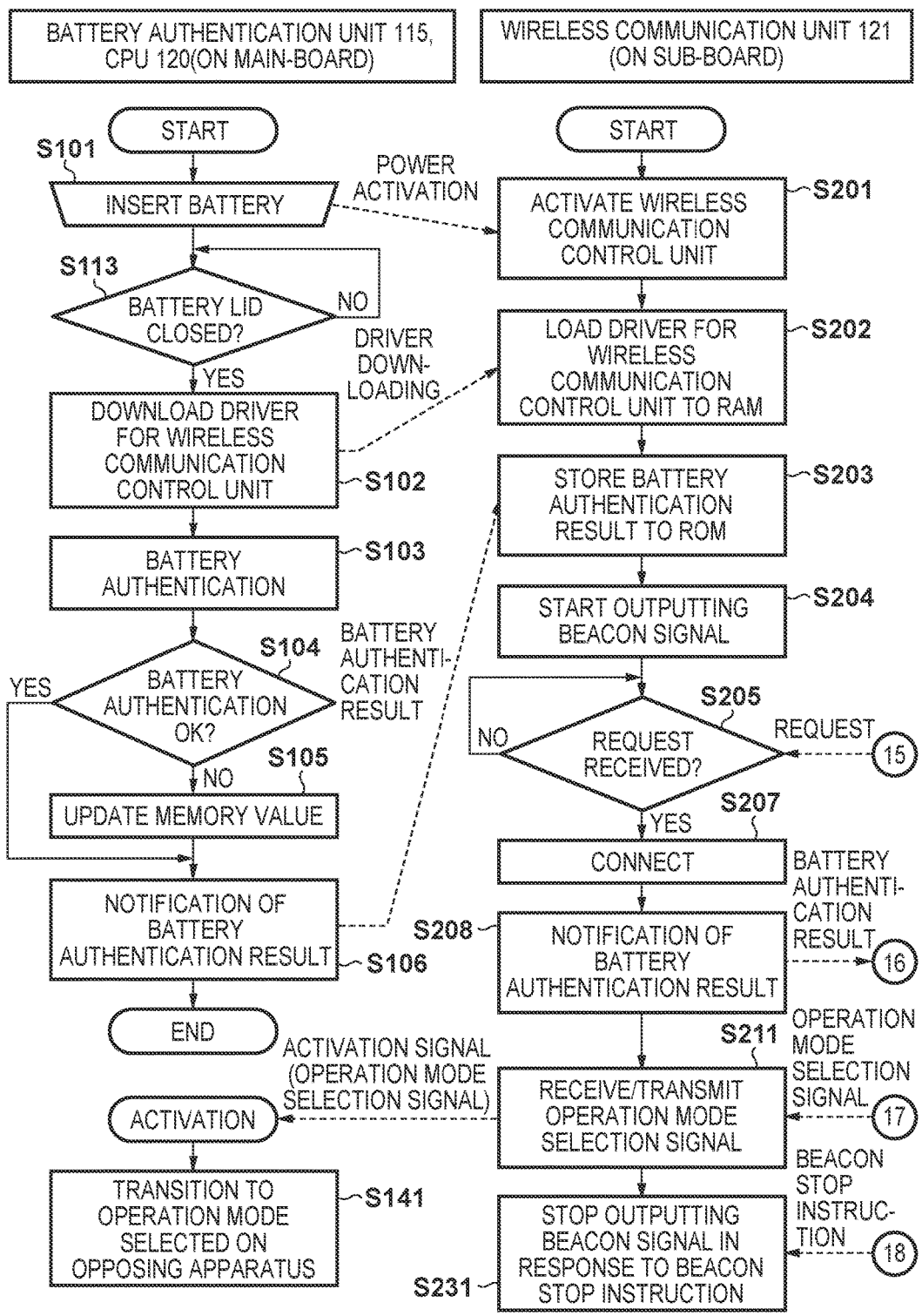

COMMUNICATION APPARATUS AND METHOD FOR CONTROLLING THE SAME

BACKGROUND OF THE INVENTION

Field of the Invention

The present invention relates to a communication apparatus and a method for controlling the communication apparatus.

Description of the Related Art

Imaging apparatuses such as digital cameras include an imaging apparatus that is provided with a battery authentication function in order to guarantee that the image apparatus properly operates. An imaging apparatus having a battery authentication function performs authentication in order to determine whether or not a battery that has been inserted into the imaging apparatus is a battery that has been guaranteed to properly operate by the manufacturer. Specifically, upon a battery being inserted into the imaging apparatus by a user, authentication of the inserted battery is performed within the imaging apparatus. The authentication result of the battery is displayed on a display unit of the imaging apparatus, and the user is thus informed of the authentication result. Therefore, the user can check the authentication result thus displayed, and set the subsequent operations of the imaging apparatus.

Imaging apparatuses such as digital cameras also include an imaging apparatus that is provided with a wireless communication function such as Bluetooth™ and a wireless LAN, in order to share various kinds of data with another imaging apparatus. This function enables the imaging apparatuses to transmit and receive various kinds of data such as image data to and from each other, without passing through a PC therebetween. Also, using the wireless communication function, it is possible to operate the imaging apparatus from a remote electronic device such as a mobile terminal.

Technology for improving user convenience, such as methods for informing a user of an authentication result or various kinds of data after the authentication has been performed, have been proposed for various authentication systems for electronic devices provided with a wireless communication function other than imaging apparatuses. For example, Japanese Patent Laid-Open No. 2009-203641 (hereinafter, "Document 1") discloses an electronic key system with which, at a time of battery exhaustion of an electronic key, a user can assuredly be aware of that, and immediately restore an on-board apparatus to a controllable state. Also, Japanese Patent Laid-Open No. 2008-141555 (hereinafter, "Document 2") discloses that in an apparatus provided with a function realizing means for realizing functions including a call originating/receiving function, restrictions on the functions of the function realizing means are lifted when information read out from a wireless IC tag provided for a mobile authentication key and information registered to the apparatus match each other.

As described above, an imaging apparatus having a wireless communication function can be activated from a remote electronic device, using wireless communication. However, even if the imaging apparatus has the battery authentication function, the user can check the result of battery authentication only on the imaging apparatus. Therefore, when activating the imaging apparatus by using an electronic device from a place that is remote from the imaging apparatus, the user cannot obtain the result of battery authentication. This is inconvenient for the user.

SUMMARY OF THE INVENTION

The present invention has been made in view of the above-described problem, and provides an electronic device and a control method thereof that make it possible to check the result of battery authentication for the electronic device on another electronic device that is an opposing apparatus in terms of wireless communication.

According to one aspect of the present invention, there is provided a communication apparatus that can be driven with a battery, comprising: an authentication unit arranged to authenticate a battery attached to the communication apparatus; and a wireless communication unit arranged to communicate with an external apparatus via a wireless network, wherein the wireless communication unit is arranged to transmit a result of authentication by the authentication unit to the external apparatus via the wireless network.

According to another aspect of the present invention, there is provided a method for controlling a communication apparatus that can be driven with a battery, the method comprising: authenticating a battery attached to the communication apparatus; and transmitting a result of authentication to an external apparatus via a wireless network.

Further features of the present invention will become apparent from the following description of embodiments (with reference to the attached drawings).

BRIEF DESCRIPTION OF THE DRAWINGS

FIG. 1A is a block diagram showing an example of a configuration of an imaging apparatus according to an embodiment.

FIG. 2 is a diagram illustrating a configuration related to wireless communication performed within the imaging apparatus according to the embodiment.

FIGS. 3A to 3C are flowcharts illustrating operations of an imaging apparatus according to a first embodiment.

FIGS. 6A to 6C are flowcharts illustrating operations of an imaging apparatus according to a second embodiment.

FIG. 6D is a flowchart illustrating operations of a mobile terminal according to the second embodiment.

FIGS. 7A to 7F are diagrams showing examples of content displayed by the mobile terminal according to the second embodiment.

FIG. 11A is a flowchart illustrating operations of an imaging apparatus according to a fifth embodiment.

DESCRIPTION OF THE EMBODIMENTS

The following describes preferred embodiments of the present invention in detail with reference to the accompanying drawings.

First Embodiment

Figure 1B:
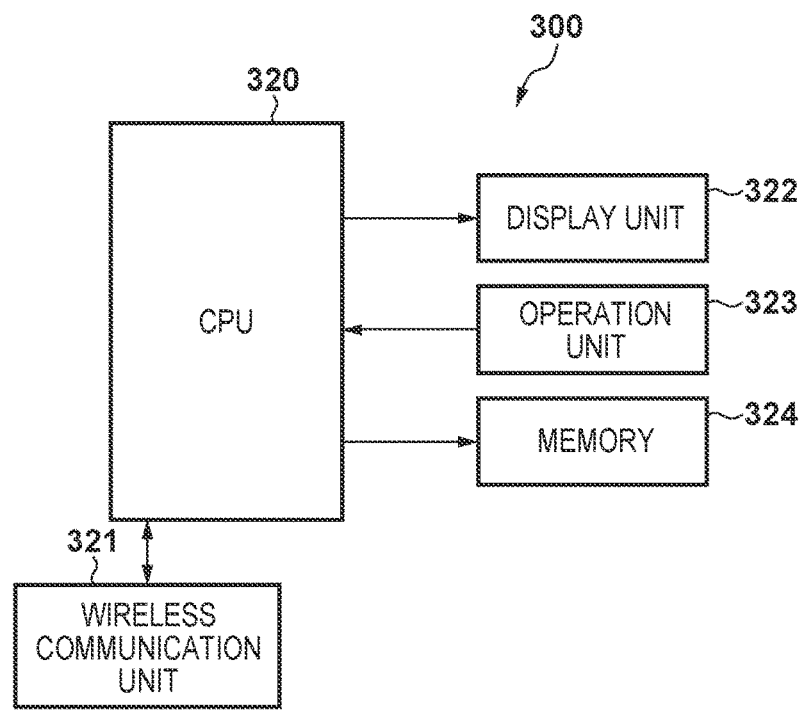
FIG. 1B is a block diagram showing an example of a configuration of a mobile terminal according to the embodiment.
Figure 1C:
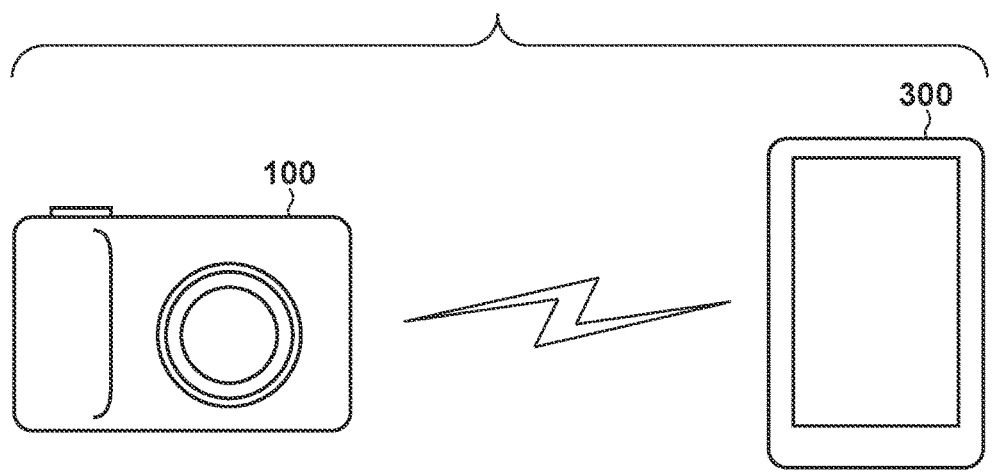
FIG. 1C is a diagram showing a system configured with the imaging apparatus and the mobile terminal according to the embodiment.

The following describes a wireless terminal apparatus according to a first embodiment with reference to FIGS. 1A to 1C, 2, 3A and 3B, 4A to 4C, and 5A to 5C. FIG. 1A is a block diagram showing a configuration of an imaging apparatus, which is an example of an electronic device (wireless terminal apparatus) provided with a battery authentication function according to the first embodiment. FIG. 1B is a block diagram showing a configuration of a mobile terminal, which is an example of an electronic device (wireless terminal apparatus) serving as a communication party apparatus (opposing apparatus) for the imaging apparatus. FIG. 1C shows a configuration of a communication system according to the first embodiment.

As shown in FIG. 1C, the communication system according to the present embodiment includes an imaging apparatus 100 and a mobile terminal 300 connected to each other via wireless communication, for example. The imaging apparatus 100 is an example of an electronic device that can be driven with a battery and that performs battery authentication. The mobile terminal 300 is an example of an electronic device that is connected to the imaging apparatus 100, which is an external apparatus, using wireless communication.

First, a configuration of the imaging apparatus 100 is described with reference to FIG. 1A. An optical unit 101 is provided with a zoom lens, a focus lens, and an aperture, as well as a motor, an actuator, and a drive circuit that drive the zoom lens, the focus lens, and the aperture. An imaging device 102 performs photoelectric conversion by forming an image of light from a subject, on a light-receiving surface thereof. An imaging driver 103 drives the imaging device 102 and causes the imaging device 102 to transfer the electric charge of each pixel resulting from the photoelectric conversion, thereby causing the imaging device 102 to output a captured-image signal. An amplifier 104 amplifies the captured-image signal output from the imaging device 102, after removing noise therefrom by performing correlated double sampling. An A/D converter 105 generates image data by performing digital conversion on the captured-image signal amplified by the amplifier 104.

An image data processing circuit 106 applies various kinds of image processing, such as matrix operations, white balance adjustment, and gamma processing, to the input image data. A frame memory 107 temporarily stores image data processed by the image data processing circuit 106. A compression/decompression processing circuit 108 compresses or decompresses image data, using the frame memory 107. A memory card 109 records an image file thereon. A read/write (R/W) circuit 110 writes or reads out an image file compressed by the compression/decompression processing circuit 108 to or from the memory card 109. An image feature extraction circuit 116 extracts a feature of image information. A pixel sensitivity calculation circuit 117 calculates appropriate sensitivity for each pixel of image information obtained by the imaging device 102.

An autofocus circuit (hereinafter, "AF circuit 111") detects the focal distance based on image data corresponding to a ranging area stored in the frame memory 107. An automatic exposure circuit (hereinafter, "AE circuit 112") measures subject brightness based on image data corresponding to a ranging area stored in the frame memory 107, and obtains an aperture value, an exposure time, and an exposure condition that indicates whether or not to fire the electronic flash, which is not shown in the drawings, by performing calculation based on a photometric value. An automatic white balance circuit (hereinafter, "AWB circuit 113") automatically adjusts the white balance at the time of image capturing.

A battery 118 can be attached to and removed from the imaging apparatus 100, and supplies power to each unit of the imaging apparatus 100 while being attached to the imaging apparatus 100. A battery authentication unit 115 communicates with the battery 118 attached to the imaging apparatus 100, and performs battery authentication. A battery lid detection unit 114 detects that a lid (not shown in the drawings) of a battery housing box, into which the battery 118 is to be inserted, is open or closed. An example of communication between the battery authentication unit 115 and the battery 118 is serial communication. The authentication result of the battery 118 is stored in a memory 124, for example. During battery authentication, the manufacturer, the type, the serial number, and so on of the battery that has been inserted are checked.

A CPU 120 realizes various kinds of control for the imaging apparatus 100 by executing programs stored in the memory 124, for example. A wireless communication unit 121 performs control to transmit and receive various kinds of data such as image data to and from an external apparatus. The wireless communication unit 121 transmits and receives various kinds of data and so on to and from an external apparatus, which is an opposing apparatus in terms of wireless communication, based on terminal information stored in the memory 124 for example.

A display unit 122 is configured with a liquid crystal display device for example, and displays a playback image, and when in an image capturing mode, functions as an electronic viewfinder as well by displaying a through-the-lens image used for checking a subject. An operation unit 123 includes a power button, a release button, a mode switching dial, and so on. The memory 124 records thereon setting values relating to exposure, such as an aperture value and a shutter speed, and terminal information or the like used for wireless communication. Programs to be executed by the CPU 120 may be stored in the memory 124, as described above.

FIG. 1B is a block diagram showing a configuration of the mobile terminal 300, which is an example of an electronic device that serves as an opposing apparatus for the imaging apparatus 100. In the mobile terminal 300, a CPU 320 realizes various kinds of operations of the mobile terminal 300 by executing programs stored in a memory 324, for example. A wireless communication unit 321 realizes wireless communication with an external apparatus (e.g. the imaging apparatus 100). A display unit 322 is configured with a liquid crystal display device for example, and displays various kinds of information regarding the mobile terminal 300 under the control of the CPU 320. An operation unit 323 receives a user operation and provides the CPU 320 with an operation signal. The operation unit 323 may be configured with a touch panel or the like. The memory 324 stores programs to be executed by the CPU 320 and various kinds of data, and also provides a work area for the CPU 320.

In FIGS. 1A, 1B, and 1C, a digital camera (the imaging apparatus 100) is described as an example of the wireless terminal apparatus. However, the present invention is not limited in such a manner. For example, the wireless terminal apparatus may be any electronic device such as a smartphone as long as it can be driven with a battery and has the battery authentication function and the wireless communication function. Also, although a mobile terminal has been described as an example of the opposing apparatus for the imaging apparatus 100, the present invention is not limited in such a manner. The opposing apparatus may be any electronic device as long as it has the wireless communication function. Of course, the opposing apparatus is not necessarily of a mobile type.

Next, the details of the CPU 120, the battery authentication unit 115, and the wireless communication unit 121 of the imaging apparatus 100 will be described with reference to FIG. 2. In the imaging apparatus 100, the CPU 120 and the battery authentication unit 115 are mounted on a main-board, and the wireless communication unit 121 is mounted on a sub-board. The main-board and the sub-board are connected to each other via a flexible board or the like. The CPU 120 on the main-board is provided with an information control unit 191 for connecting to the wireless communication unit 121 and transmitting and receiving various kinds of information such as the battery authentication result to and from the wireless communication unit 121.

The wireless communication unit 121 on the sub-board is provided with: a wireless communication control unit 210 for controlling communication with the information control unit 191 on the main-board and controlling wireless communication with the opposing apparatus (e.g. the mobile terminal 300); and an antenna unit 211 for transmitting and receiving a wireless signal to and from the opposing apparatus. In the present embodiment, a Bluetooth™ communication method is used by the wireless communication control unit 210, for example. The antenna unit 211 is a chip antenna or a pattern antenna, for example.

The wireless communication control unit 210 is provided with an information control unit 212 for transmitting and receiving various kinds of information such as the battery authentication result to and from the information control unit 191. Communication between the information control unit 191 and the information control unit 212 is controlled using serial communication, for example. Furthermore, a ROM 213 and a RAM 214 are connected to the wireless communication control unit 210. The ROM 213 is for storing various kinds of information regarding the wireless communication unit 121, and the RAM 214 is for temporarily storing information loaded thereto, namely various kinds of information received by the information control unit 212, and information stored in the ROM 213.

Power (VBAT) is supplied from the battery 118, which is the main battery, to both the main-board and the sub-board so that the main-board and the sub-board can each operate independently. Note that the configurations above are examples. The configurations are not limited to the description above, and may be modified as appropriate. For example, the antenna is not necessarily provided on the wireless communication unit 121, and may be located at a place that is not on the wireless communication unit 121, by extending the antenna line using a lead wire.

Figure 3A:
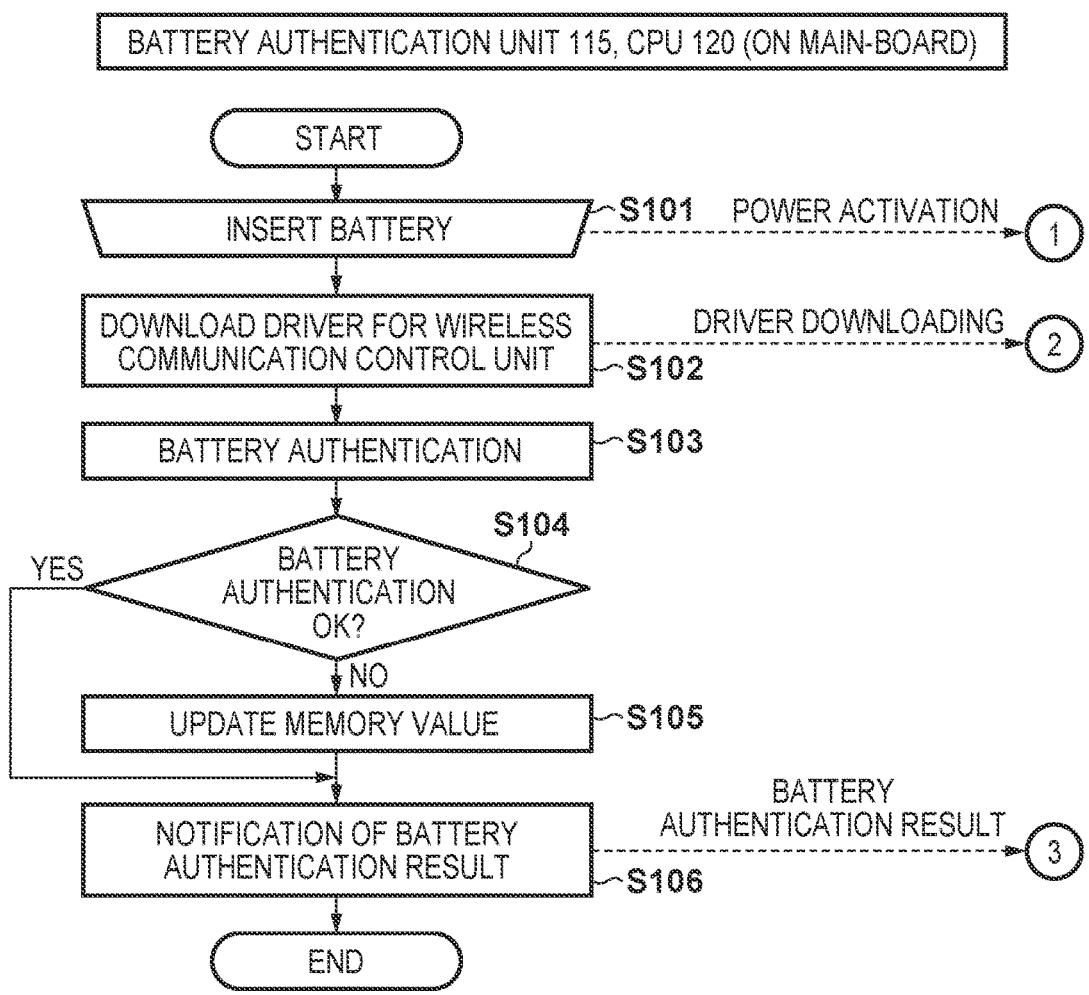
Figure 3B:
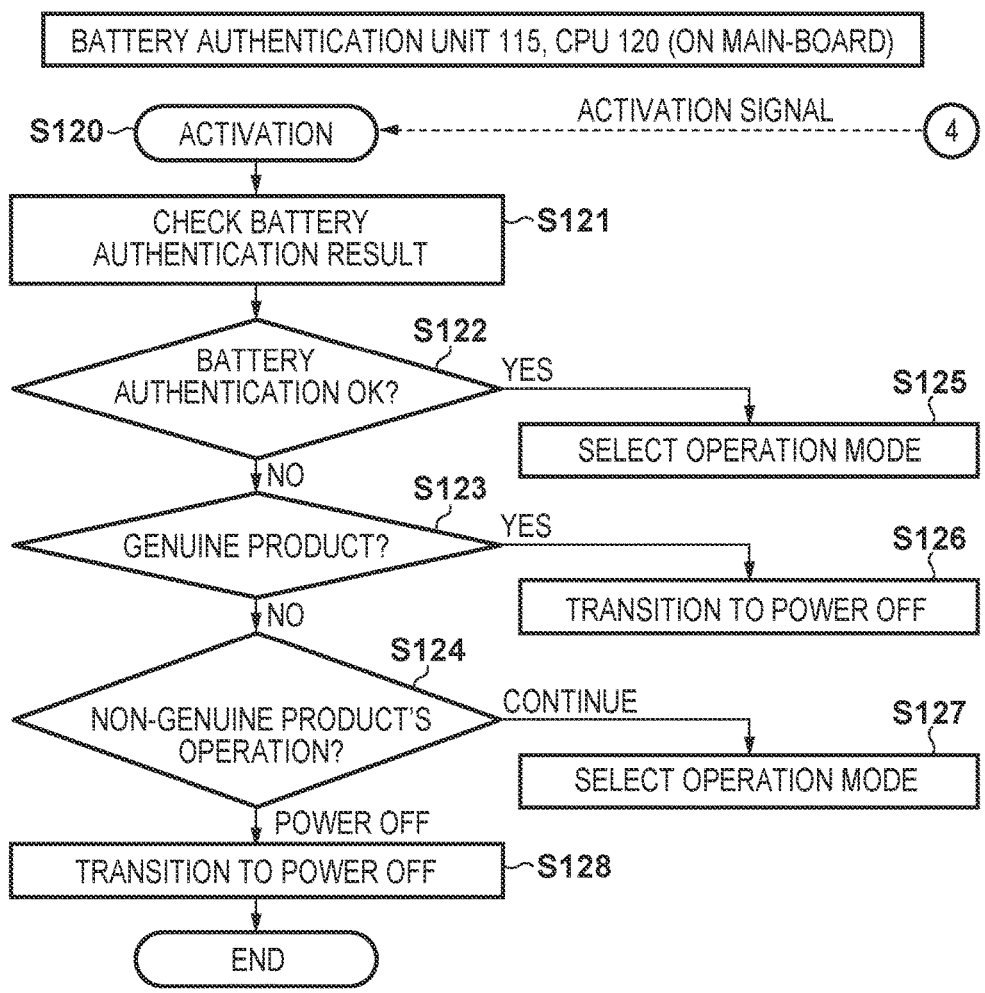
Figure 3D:
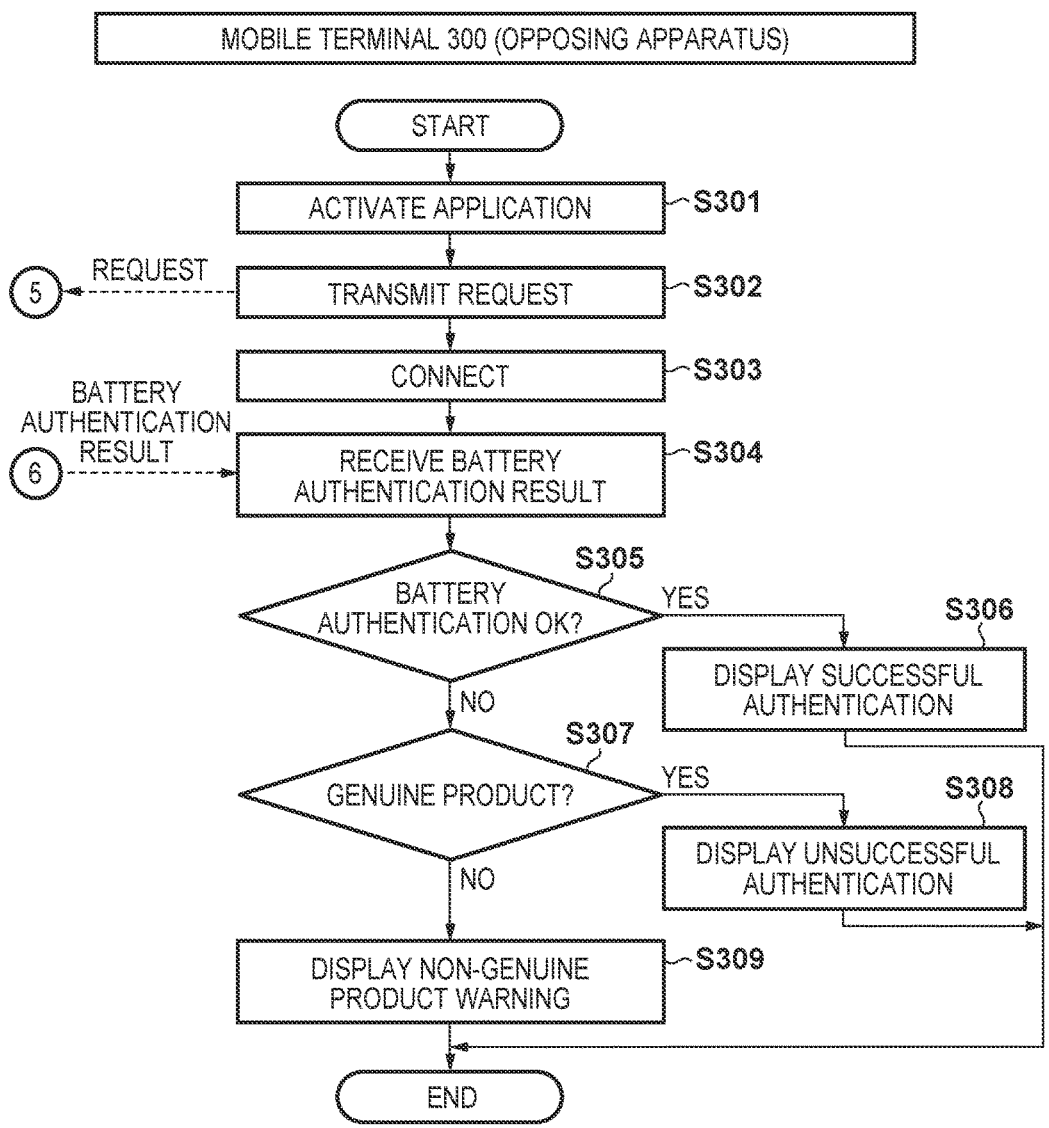
FIG. 3D is a flowchart illustrating operations of a mobile terminal according to the first embodiment.

FIGS. 3A to 3C show a flowchart illustrating the operations of the imaging apparatus 100 according to the first embodiment, and FIG. 3D shows a flowchart illustrating the operations of the mobile terminal 300 according to the first embodiment. The following describes the operations of the imaging apparatus 100 and the mobile terminal 300 according to the first embodiment (in particular, the operation by which the mobile terminal 300 activates the imaging apparatus 100) with reference to the flowchart shown in FIGS. 3A to 3D.

In step S101, a user inserts the battery 118, which serves as the main battery, into the imaging apparatus 100. Upon the battery 118 being inserted, power is supplied from the battery 118 to both the main-board and the sub-board, the CPU 120 is activated, and also the wireless communication control unit 210 on the sub-board is activated in step S201. In step S102, the CPU 120 reads out a control program (a driver) for the wireless communication control unit 210 from the memory 124, and transmits the control program to the information control unit 212 in the wireless communication control unit 210 via the information control unit 191. In step S103, the battery authentication unit 115 communicates with the battery 118, and performs authentication (battery authentication) of the battery 118 that has been inserted. In step S202, the wireless communication control unit 210 loads the control program received by the information control unit 212 to the RAM 214, and starts a wireless communication operation by executing the control program.

In step S104, the CPU 120 checks the authentication result of the battery 118 performed by the battery authentication unit 115 in step S103. If the battery authentication is unsuccessful (NO in step S104), processing proceeds to step S105, and the CPU 120 updates the battery authentication information in the memory 124. If the battery authentication is successful (YES in step S104), processing proceeds to step S106. In step S106, the CPU 120 notifies the wireless communication unit 121 of the battery authentication result via the information control unit 191. Note that the battery authentication result includes information regarding whether or not the battery authentication was successful and information regarding whether or not the battery is a genuine product.

Although the battery authentication information is stored in the memory 124 of the imaging apparatus 100 in the present embodiment, the battery authentication information may be stored in a flip-flop or the like separately provided to store the battery authentication information, for example. Also, although the authentication result in the memory 124 is updated when the battery authentication is unsuccessful in the flowchart above, the authentication result may be updated when the battery authentication is successful, or both the successful state and the unsuccessful state may be recorded as the authentication information. Thereafter, the CPU 120 stops operating and enters a power OFF state, and maintains this state until the user operates the power button or the CPU 120 receives an activation signal from the wireless communication unit 121.

In step S203, the wireless communication control unit 210 on the sub-board stores the battery authentication result received by the information control unit 212 to the ROM 213. In step S204, the wireless communication control unit 210 starts outputting a beacon signal, and in step S205, enters the state of waiting to receive a request signal from the opposing apparatus, which is an external apparatus.

In the mobile terminal 300, which is the opposing apparatus, when the user activates an application for communication with the imaging apparatus 100, an activation process for the imaging apparatus 100 as shown in FIG. 3D is executed. In step S301, the CPU 320 activates the application. The application thus activated can receive a user instruction to start communication with the imaging apparatus 100. In response to the application being activated, or upon receiving the user instruction to start communication with the imaging apparatus 100 after the application is activated, the CPU 320, in step S302, transmits a request signal to the imaging apparatus 100 via the wireless communication unit 321. Note that the CPU 320 transmits the request signal in response to the beacon signal received from the imaging apparatus 100, and consequently procedures for starting communication (connection) with the imaging apparatus 100 are executed. When in the power OFF state, the imaging apparatus 100 enters a power ON state upon receiving the request signal, and is activated.

In step S205, the wireless communication control unit 210 of the imaging apparatus 100 determines whether or not the request signal transmitted from the mobile terminal 300 has been received. Upon the wireless communication unit 121 of the imaging apparatus 100 receiving the request signal transmitted from the wireless communication unit 321 of the mobile terminal 300, which is the opposing apparatus (YES in step S205), processing proceeds to step S206. In step S206, the wireless communication control unit 210 transmits a signal for activating a system (an activation signal) to the information control unit 191 of the CPU 120 via the information control unit 212.

Thereafter, in steps S207 and S303, the wireless communication unit 121 of the imaging apparatus 100, and the wireless communication unit 321 of the mobile terminal 300, which has transmitted the request signal, establish connection for mutual wireless communication. Upon establishment of a connection for wireless communication, in step S208, the wireless communication control unit 210 transmits the battery authentication result stored in the ROM 213 to the mobile terminal 300, which is the opposing apparatus. Thus, in response to receiving the request, the CPU 120 transmits the result of authentication by the battery authentication unit 115 to the mobile terminal 300, which is an external apparatus, via the wireless communication unit 121. Note that in battery authentication in the present embodiment, whether or not the attached battery is a genuine product is checked, and the result of authentication is included in the battery authentication result. In the present embodiment, if battery authentication is successful, the battery is always a genuine product. It is assumed that if battery authentication is unsuccessful, the battery can be a genuine product or a non-genuine product. An example of this case is a case in which authentication cannot be complete even though the manufacturer of the battery has been verified. Therefore, in the present embodiment, there are three possible battery authentication results, namely "successful battery authentication", "genuine product and unsuccessful battery authentication", and "non-genuine product".

Figure 4C:
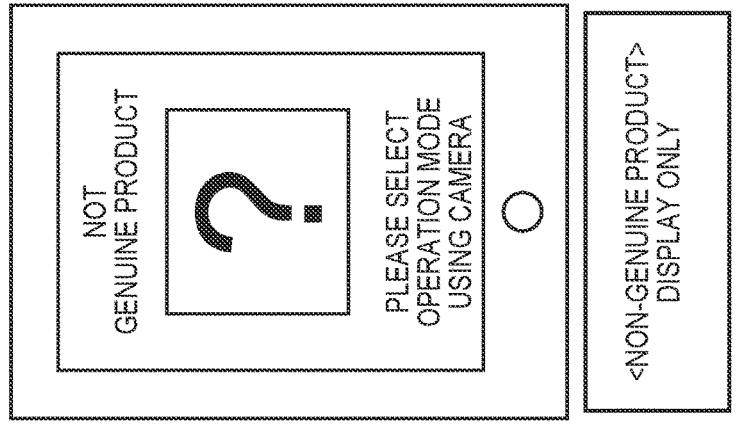
FIGS. 4A to 4C are diagrams showing examples of content displayed by the mobile terminal according to the first embodiment.
Figure 4B:
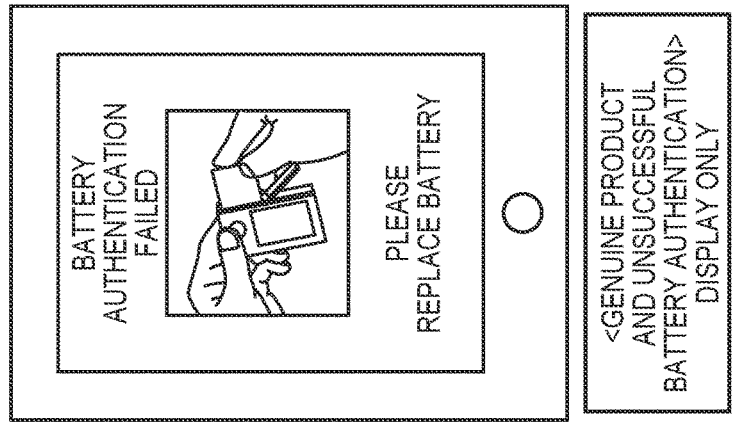
Figure 4A:
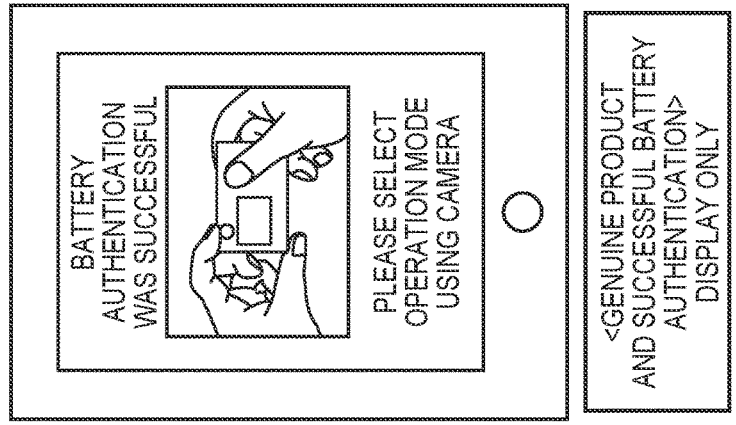

In the mobile terminal 300, upon establishing a connection for wireless communication (step S303), the CPU 320, in step S304, receives the battery authentication result transmitted by the imaging apparatus 100. Then, the CPU 320 executes display control to display a screen corresponding to the received battery authentication result, on the display unit 322 (step S305 to step S309). The content to be displayed on the display unit 322 of the mobile terminal 300, which is the opposing apparatus for the imaging apparatus 100, are described below with reference to FIGS. 4A to 4C. If the battery authentication result indicates "successful battery authentication", processing proceeds from step S305 to step S306. In step S306, the CPU 320 of the mobile terminal 300 displays information indicating that battery authentication was successful on the display unit 322 as shown in FIG. 4A, thereby prompting the user to select an operation, using the imaging apparatus 100. If the battery authentication result indicates "genuine product and unsuccessful battery authentication", processing proceeds from step S307 to step S308. In step S308, the CPU 320 of the mobile terminal 300 displays information indicating that battery authentication failed on the display unit 322 as shown in FIG. 4B, thereby prompting the user to replace the battery inserted into the imaging apparatus 100. If the battery authentication result indicates "non-genuine product", processing proceeds from step S307 to step S309. In step S307, the CPU 320 displays information indicating that the battery is not a genuine product on the display unit 322 as shown in FIG. 4C, thereby prompting the user to select an operation, using the imaging apparatus 100.

Figure 5A:
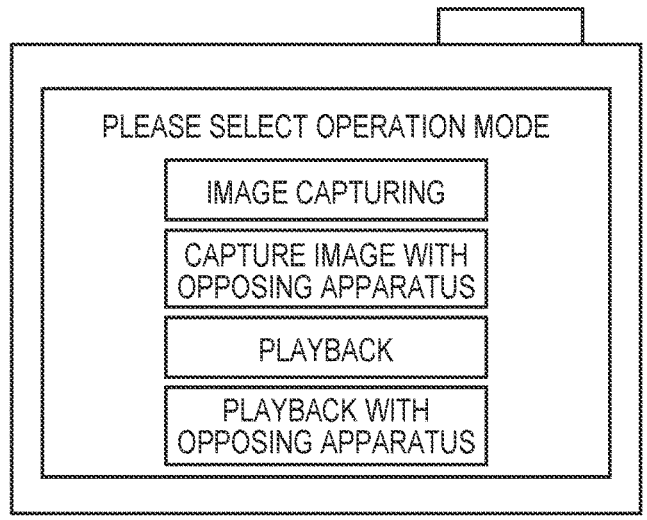
FIGS. 5A to 5C are diagrams showing examples of content displayed by the imaging apparatus according to the first embodiment.

Meanwhile, upon the information control unit 191 receiving the activation signal transmitted from the wireless communication unit 121 in step S206, activation control for the CPU 120 is executed (step S120). In activation control, the imaging apparatus 100 is activated upon receipt of the request from the mobile terminal 300, and the imaging apparatus 100 operates based on the battery authentication result. The following describes activation control for the imaging apparatus 100 according to the present embodiment. Upon being activated by the activation signal, the CPU 120, in step S121, first checks the result of battery authentication performed in step S103 by referencing the authentication information in the memory 124. If the authentication information indicates "successful battery authentication", processing proceeds from step S122 to step S125, and the CPU 120 displays a mode selection screen as shown in FIG. 5A on the display unit 122. The user can select a desired operation mode from the mode selection screen by operating the operation unit 123. Thereafter, the CPU 120 causes the imaging apparatus 100 to transition to the selected operation mode.

Figure 5B:
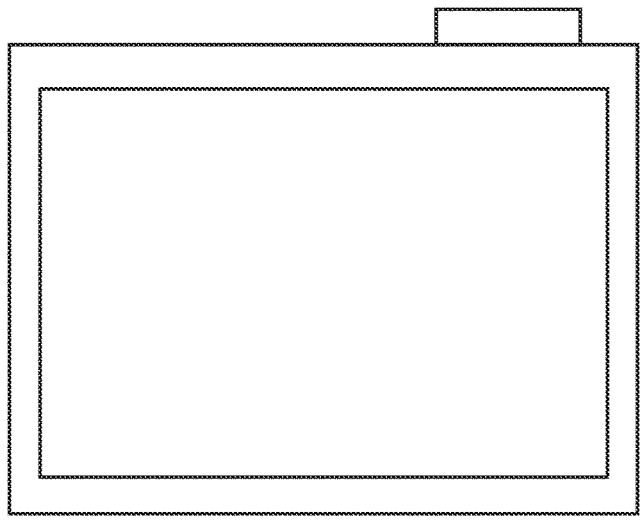

If the authentication information indicates "genuine product and unsuccessful battery authentication", processing proceeds from step S123 to step S126 in order to execute a stopping operation. In step S126, the CPU 120 stops operating, and transitions to the power OFF state. In this way, in the case of "genuine product and unsuccessful battery authentication", the CPU 120 is turned OFF immediately after the battery authentication result has been checked. Therefore, nothing is displayed on the display unit 122 as shown in FIG. 5B. It is acceptable that the activation signal is not output in step S206 if the battery authentication result stored in the ROM 213 in step S203 indicates "genuine product and unsuccessful battery authentication". If this is the case, the external apparatus cannot activate the imaging apparatus 100, and the power button is operated to activate (power ON) the imaging apparatus 100. If the imaging apparatus 100 is thus activated, the imaging apparatus 100 displays a warning indicating "genuine product and unsuccessful battery authentication" for a predetermined period of time, and transitions to the power OFF state.

Figure 5C:
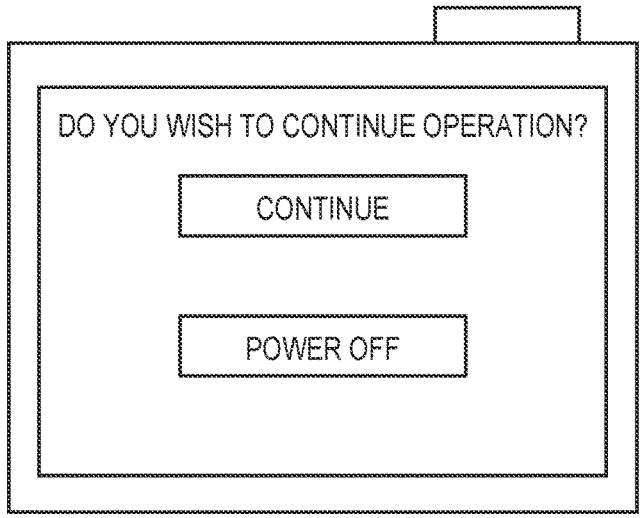
Figure 6B:
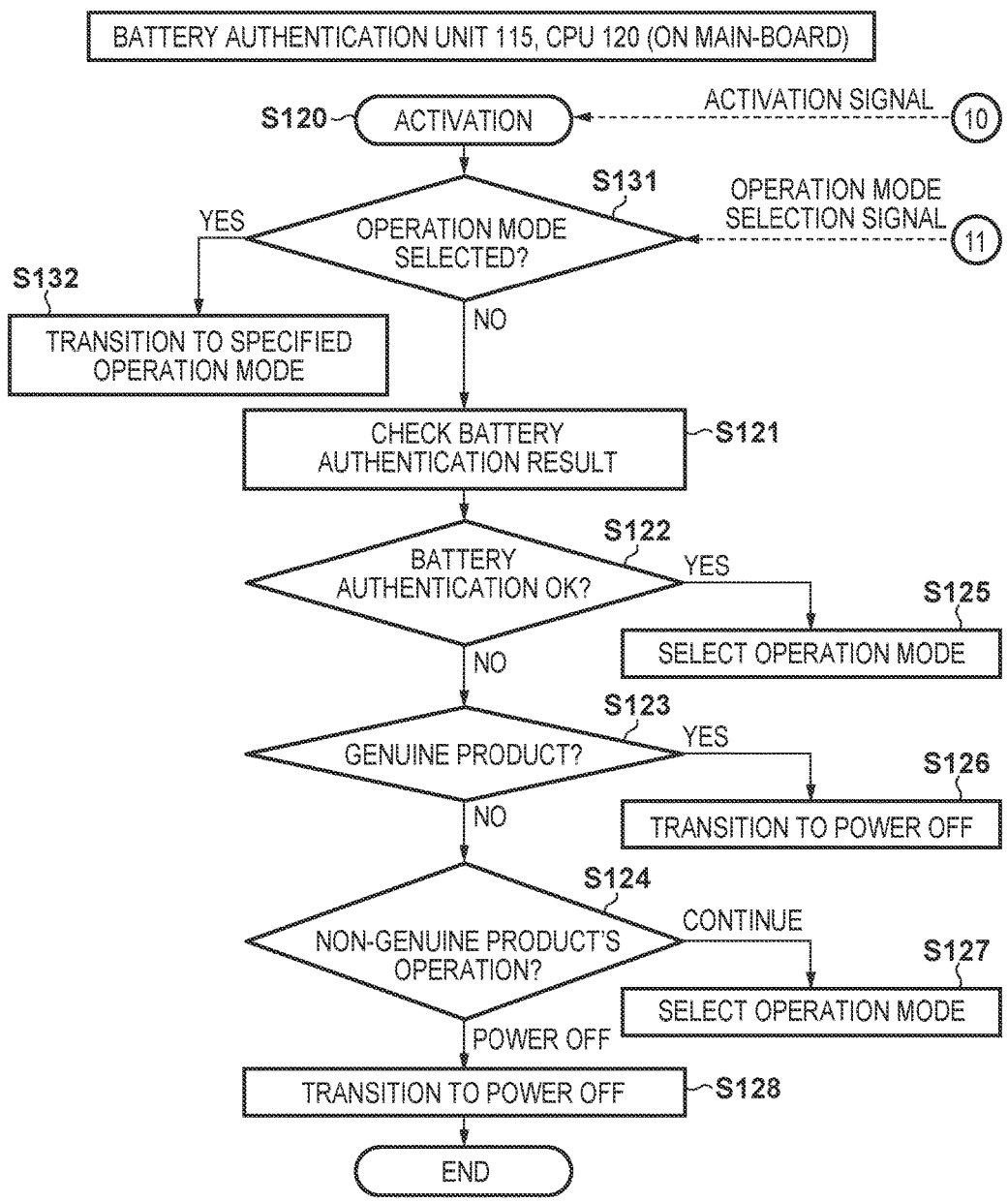
Figure 6C:
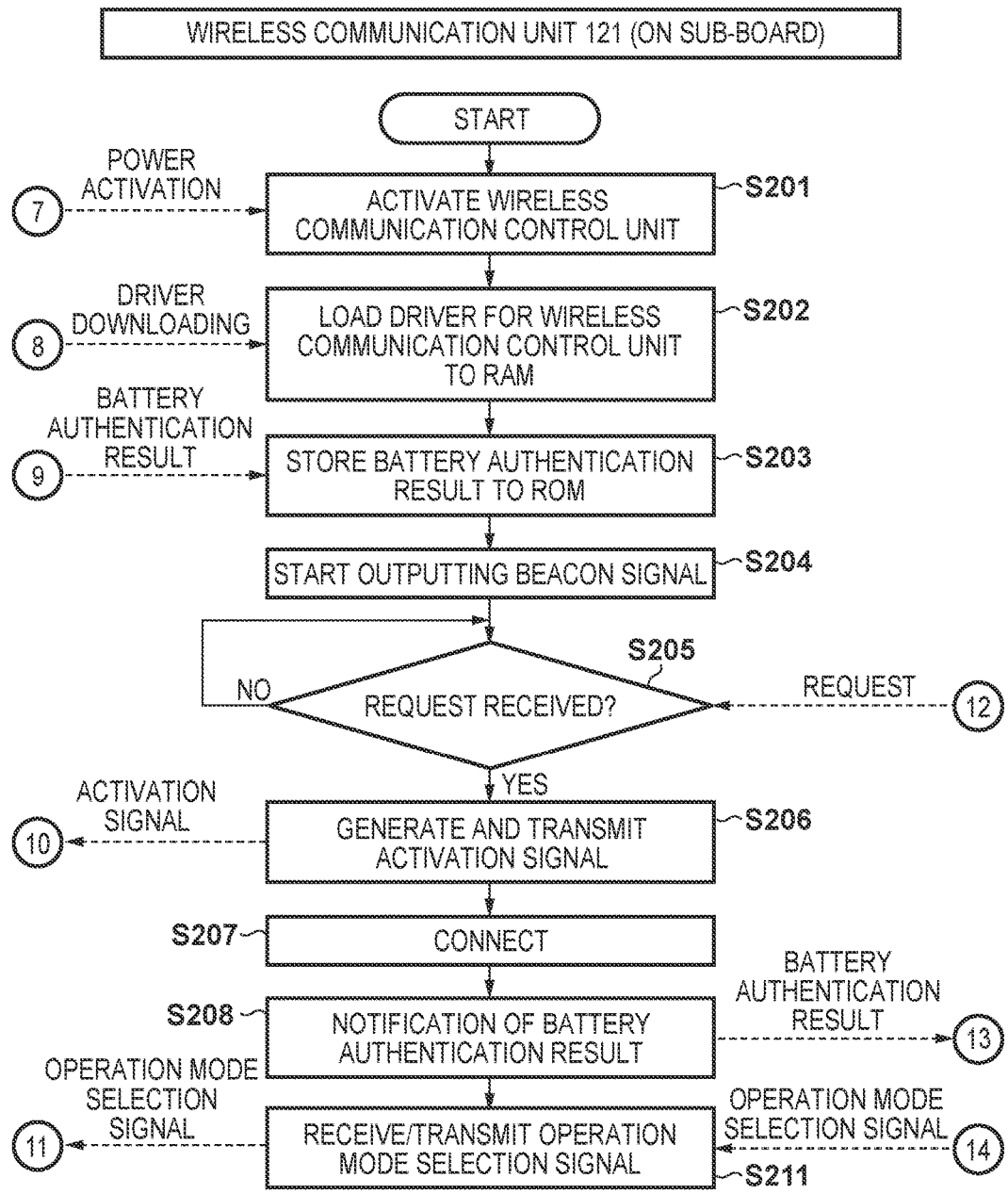

If the authentication information indicates "non-genuine product", processing proceeds from step S123 to step S124. In step S124, the CPU 120 displays an operation instruction input screen as shown in FIG. 5C on the display unit 122, and waits until the user inputs an instruction to continue the operation or power OFF. The user operates the operation unit 123 of the imaging apparatus 100 to select whether to continue the operation of the imaging apparatus 100 or power OFF the imaging apparatus 100 and stop the operation. If the user selects "continue", processing proceeds from step S124 to step S127, and the CPU 120 displays an operation mode selection screen as shown in FIG. 5A on the display unit 122, and transitions to the operation mode specified by the user. On the other hand, if the user selects "power OFF", processing proceeds from step S124 to step S128, and causes the imaging apparatus 100 to transition to the power OFF state.

As described above, according to the first embodiment, the authentication result of the battery inserted into an apparatus is displayed on the display unit of its opposing apparatus, and the battery authentication result of the apparatus can be checked on the opposing apparatus. Thus, convenience is improved.

Second Embodiment

The following describes a wireless terminal apparatus according to a second embodiment of the present invention with reference to FIGS. 6A to 7F. Since the basic configuration is the same as that of the first embodiment, the following mainly describes differences from the first embodiment. In the first embodiment, a description has been given of a configuration in which the battery authentication result of the imaging apparatus 100 can be checked on the mobile terminal 300 that has requested for connection to the imaging apparatus 100. The second embodiment makes it possible to check the authentication result of the battery 118 inserted into the imaging apparatus 100 on the display unit 322 of the mobile terminal 300, which is the opposing apparatus, and also provides a user interface for allowing the user to specify the operation mode when the imaging apparatus 100 is activated. Thus, the operation mode of the imaging apparatus 100 can be selected on the mobile terminal 300, and convenience is further improved.

FIGS. 6A to 6D are flowcharts illustrating operations of the imaging apparatus 100 and the mobile terminal 300 according to the second embodiment. Note that steps for performing the same processing as in the first embodiment are indicated by the same step numbers as in the first embodiment (FIGS. 3A to 3D). FIGS. 7A to 7F show examples of screens displayed on the display unit 322 of the mobile terminal 300. The following provides a description with reference to the flowcharts shown in FIGS. 6A to 6D and the examples of screens shown in FIGS. 7A to 7F.

Upon establishing a connection for wireless communication between the mobile terminal 300 and the imaging apparatus 100 (steps S207 and S303), the CPU 320 of the mobile terminal 300, in step S304, receives the battery authentication result transmitted by the imaging apparatus 100. Thereafter, the CPU 320 displays a screen corresponding to the received battery authentication result, on the display unit 322.

Specifically, if the battery authentication result indicates "successful battery authentication", processing proceeds from step S305 to step S306a, and the CPU 320 displays information indicating successful battery authentication on the display unit 322 as shown in FIG. 7A. Thereafter, processing proceeds from step S306a to step S306b, and the CPU 320 displays a screen for allowing the user to select an operation mode of the imaging apparatus 100 on the display unit 322 as shown in FIG. 7B, thereby prompting the user to select an operation mode of the imaging apparatus 100. The operation mode selected by the user on this operation mode selection screen is transmitted to the imaging apparatus 100 in step S312 as an operation mode selection signal. Thus, the user can provide an instruction regarding the operation at the time of activation to the imaging apparatus 100 from the mobile terminal 300.

Figure 7C:
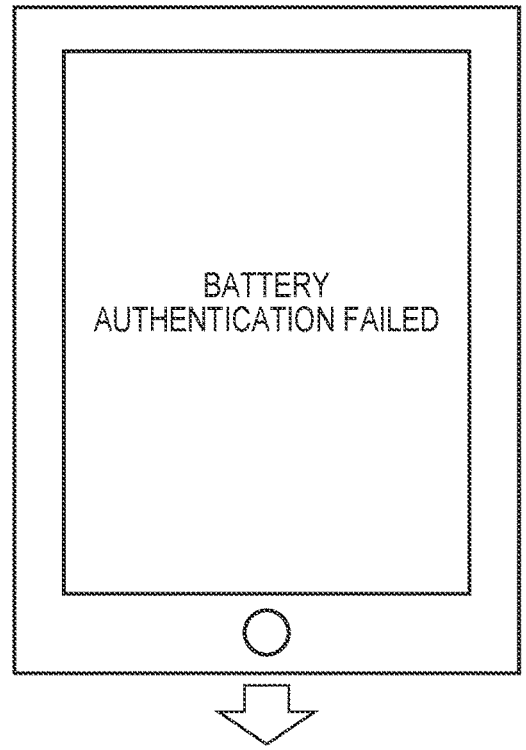
Figure 7D:
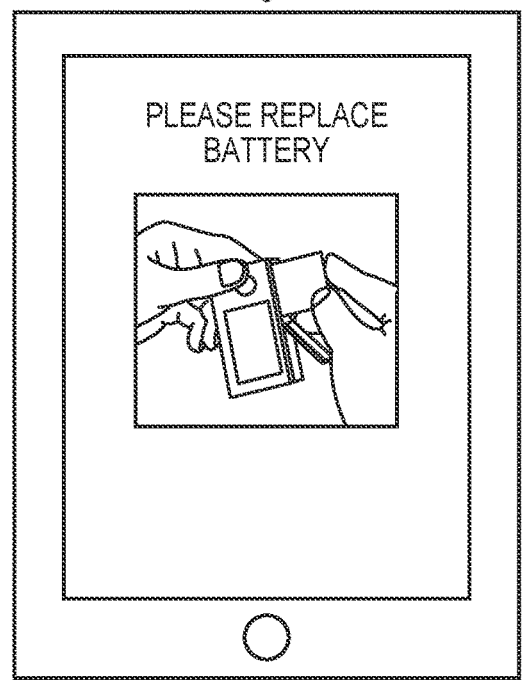

If the battery authentication result indicates "genuine product and unsuccessful battery authentication", processing proceeds from step S307 to step S308a. In step S308a, the CPU 320 displays information indicating unsuccessful battery authentication on the display unit 322 as shown in FIG. 7C. Thereafter, in step S308b, the CPU 320 displays a warning message notifying the user of the need to replace the battery inserted into the imaging apparatus 100, on the display unit 322 (FIG. 7D). If this is the case, a power OFF instruction is set as the operation mode selection signal. As a result, as described below, if the battery authentication result of the battery 118 indicates "genuine product and unsuccessful battery authentication", the CPU 120 immediately transitions to the power OFF state upon receiving the operation mode selection signal.

Figure 7E:
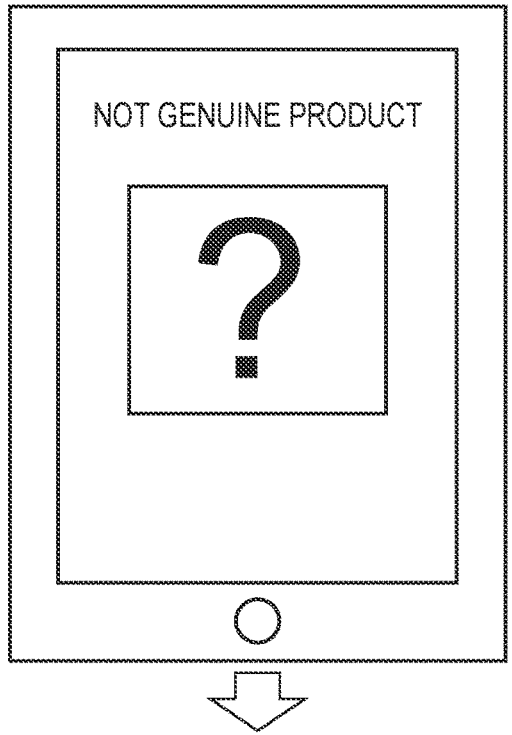
Figure 7F:
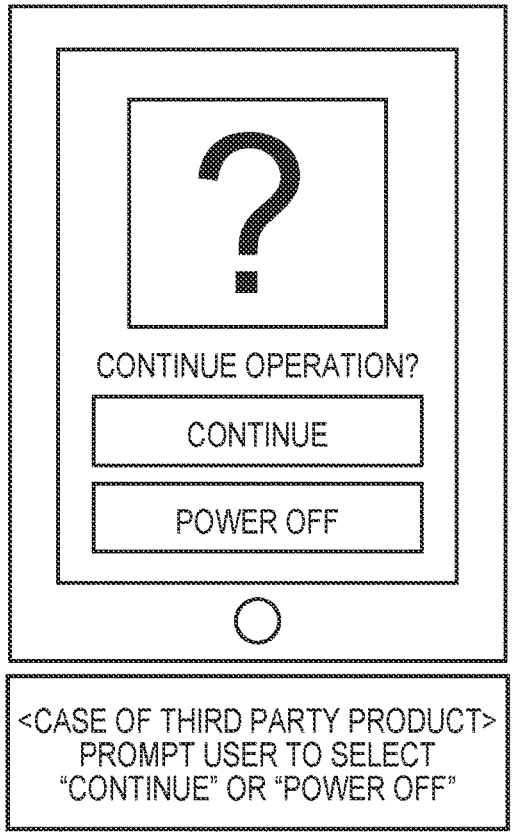

If the battery authentication result indicates "non-genuine product", processing proceeds from step S307 to step S309a, and the CPU 320 displays information indicating that the battery is not a genuine product on the display unit 322 as shown in FIG. 7E. Thereafter, in step S309b, the CPU 320 displays a screen for allowing the user to select an operation of the imaging apparatus 100 (whether to "continue" the operation or "power OFF") on the display unit 322 as shown in FIG. 7F. If "continue" is selected, processing proceeds from step S310 to step S311, and the CPU 320 displays a screen for allowing the user to select an operation mode of the imaging apparatus 100 on the display unit 322 as shown in FIG. 7B, thereby prompting the user to select an operation mode. This processing is the same as step S306b. Then, upon the user selecting an operation mode, the selected operation mode is set to the operation mode selection signal, and processing proceeds to step S312. If "power OFF" is selected on the screen shown in FIG. 7F, a power OFF instruction is set to the operation mode selection signal, and processing proceeds to step S312. In step S312, the CPU 320 transmits the operation mode selection signal indicating the operation mode selected on the mobile terminal 300 or the power OFF instruction to the imaging apparatus 100 via the wireless communication unit 321.

In step S211, upon receiving the operation mode selection signal transmitted from the wireless communication unit 321 of the mobile terminal 300, the wireless communication unit 121 of the imaging apparatus 100 transmits the operation mode selection signal to the CPU 120. The CPU 120 is activated by the activation signal transmitted from the wireless communication unit 121 in step S206 (step S120), and waits until the operation mode selection signal from the mobile terminal 300 is received (step S131). Then, upon receiving the operation mode selection signal from the wireless communication unit 121 in step S211, the CPU 120 transitions to the operation mode indicated by the operation mode selection signal. Thus, the imaging apparatus 100 transitions to the operation mode selected on the mobile terminal 300, which is the opposing apparatus.

If the received operation mode selection signal indicates that the operation mode has not been selected, or if the CPU 120 does not receive the operation mode selection signal when a predetermined period of time has elapsed since the activation of the CPU 120, processing proceeds from step S131 to S121. In steps S121 to S128, as described in the first embodiment, an operation mode or the power OFF instruction is selected on the imaging apparatus 100.

As described above, the second embodiment makes it possible to check the authentication result of the battery 118 inserted into the imaging apparatus 100 on the display unit 322 of the mobile terminal 300, which is the opposing apparatus, and furthermore, makes it possible to select the operation mode of the imaging apparatus 100 on the mobile terminal 300. Therefore, it is possible to improve convenience.

Third Embodiment

The following describes an imaging apparatus according to a third embodiment with reference to FIGS. 8 and 9A to 9C. Since the basic configuration is the same as that of the second embodiment, the following mainly describes differences from the second embodiment. In the second embodiment, a description is given of a configuration in which standby power of the imaging apparatus 100 is reduced by switching the activation operation of the CPU 120 of the imaging apparatus 100 according to the operation mode of the imaging apparatus 100 selected on the mobile terminal 300, which is the opposing apparatus.

Figure 8:
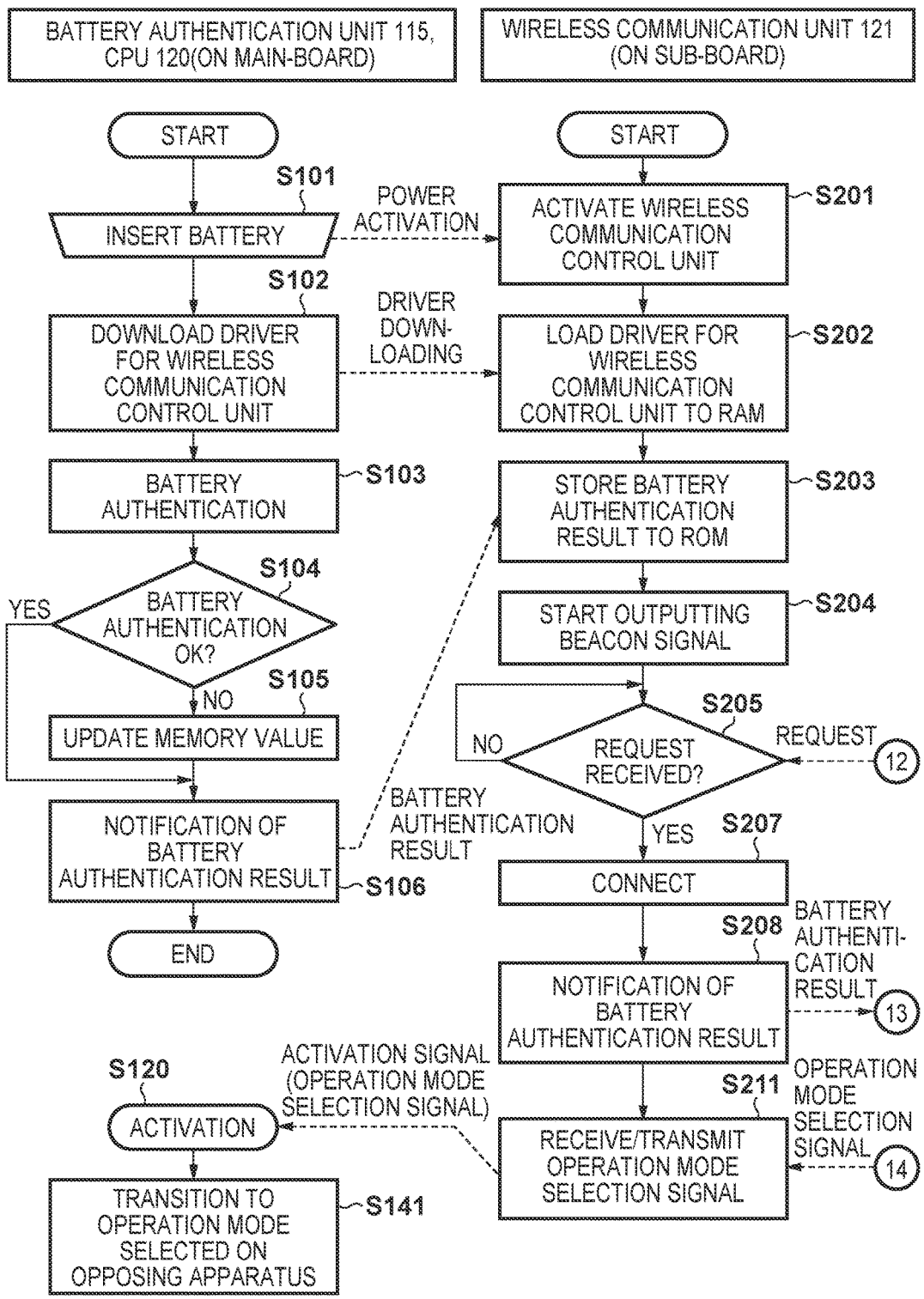
FIG. 8 is a flowchart illustrating operations of an imaging apparatus according to a third embodiment.

FIG. 8 shows a flowchart illustrating the operations of the imaging apparatus 100 according to the third embodiment. The following describes the operations of the imaging apparatus 100 according to the third embodiment with reference to the flowchart shown in FIG. 8. Note that, in FIG. 8, steps for performing the same processing as in the second embodiment (FIGS. 6A to 6C) are indicated by the same step numbers. The operations of the mobile terminal 300 are the same as those in the second embodiment (FIG. 6D), and therefore the operations are omitted from the drawing.

Upon the request signal being transmitted from the mobile terminal 300 (step S302) and being received by the wireless communication control unit 210 (YES in step S205), processing proceeds to step S207, and mutual connection between the imaging apparatus 100 and the mobile terminal 300 is established. At this time, the activation signal is not output to the CPU 120, and the CPU 120 still remains in the stopped state (the power OFF state).

Next, upon the operation mode selection signal being transmitted from the mobile terminal 300 in response to a user operation on the mobile terminal 300 (steps S305 to S312), the wireless communication unit 121 of the imaging apparatus 100 receives the operation mode selection signal in step S211. The wireless communication unit 121 transmits the received operation mode selection signal to the CPU 120 as the activation signal. The CPU 120 thus receives the activation signal and the operation mode selection signal from the wireless communication unit 121 at the same time.

Upon the information control unit 191 of the imaging apparatus 100 receiving the activation signal, the CPU 120 is activated in step S120. Upon being activated, the CPU 120 immediately determines the operation mode indicated by the operation mode selection signal transmitted as the activation signal, and transitions to the operation mode indicated by the operation mode selection signal (step S141). In this way, in the third embodiment, the CPU 120 is not activated until an operation mode is selected on the mobile terminal 300 and the imaging apparatus 100 receives the operation mode selection signal, and therefore the standby power of the imaging apparatus 100 can be reduced.

If "power OFF" has been set to the operation mode selection signal, the CPU 120 immediately transitions to the power OFF state. In step S211, it is acceptable that the wireless communication unit 121 does not transmit the operation mode selection signal (the activation signal) to the CPU 120 if the operation mode selection signal indicates "power OFF". If this is the case, it is possible to prevent the CPU 120 from being activated despite the power OFF instruction and then immediately transiting to the power OFF state.

Figure 9:
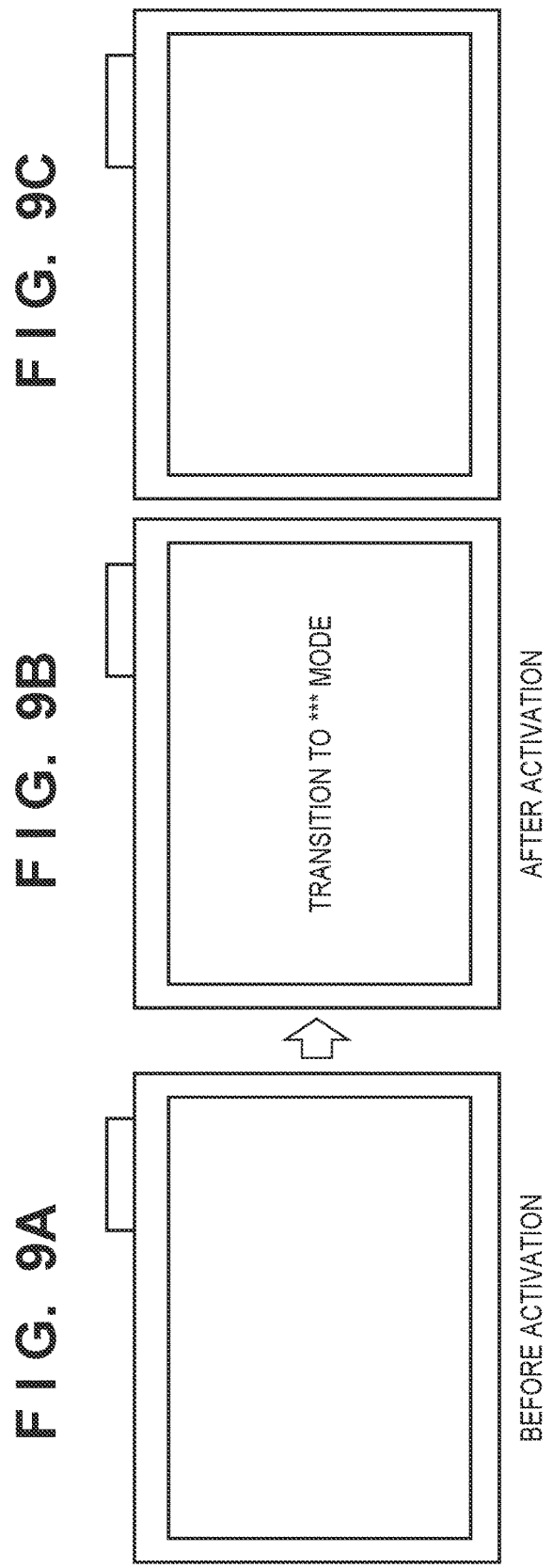
FIGS. 9A to 9C are diagrams showing examples of content displayed by the imaging apparatus according to the third embodiment.

FIGS. 9A to 9C are diagrams showing examples of screens displayed on the display unit 122 of the imaging apparatus 100 according to the third embodiment. Before the CPU 120 is activated, nothing is displayed on the display unit 122 as shown in FIG. 9A because the power of the CPU 120 is OFF. It is assumed that thereafter an operation mode is selected on the mobile terminal 300 (step S306b and step S311), the operation mode selection signal is transmitted (step S312), and the CPU 120 is activated. If this is the case, as shown in FIG. 9B, the CPU 120 displays information indicating that the CPU 120 is about to transition to the operation mode specified by the operation mode selection signal received by the wireless communication unit 121, on the display unit 122. If no operation mode is selected on the mobile terminal 300, the operation mode selection signal transmitted from the wireless communication unit 121 indicates power OFF, or the operation mode selection signal is not transmitted from the wireless communication unit 121. Therefore, the CPU 120 immediately stops operating (enters the power OFF state) after being activated, or is not activated. Therefore, as shown in FIG. 9C, the screen remains in the state of showing nothing.

As described above, in the third embodiment, the operation to activate the CPU 120 of the imaging apparatus 100 is switched according to the operation mode selected on the mobile terminal 300, which is the opposing apparatus. Therefore, it is possible to reduce the standby power of the imaging apparatus 100.

Fourth Embodiment

Figure 10:
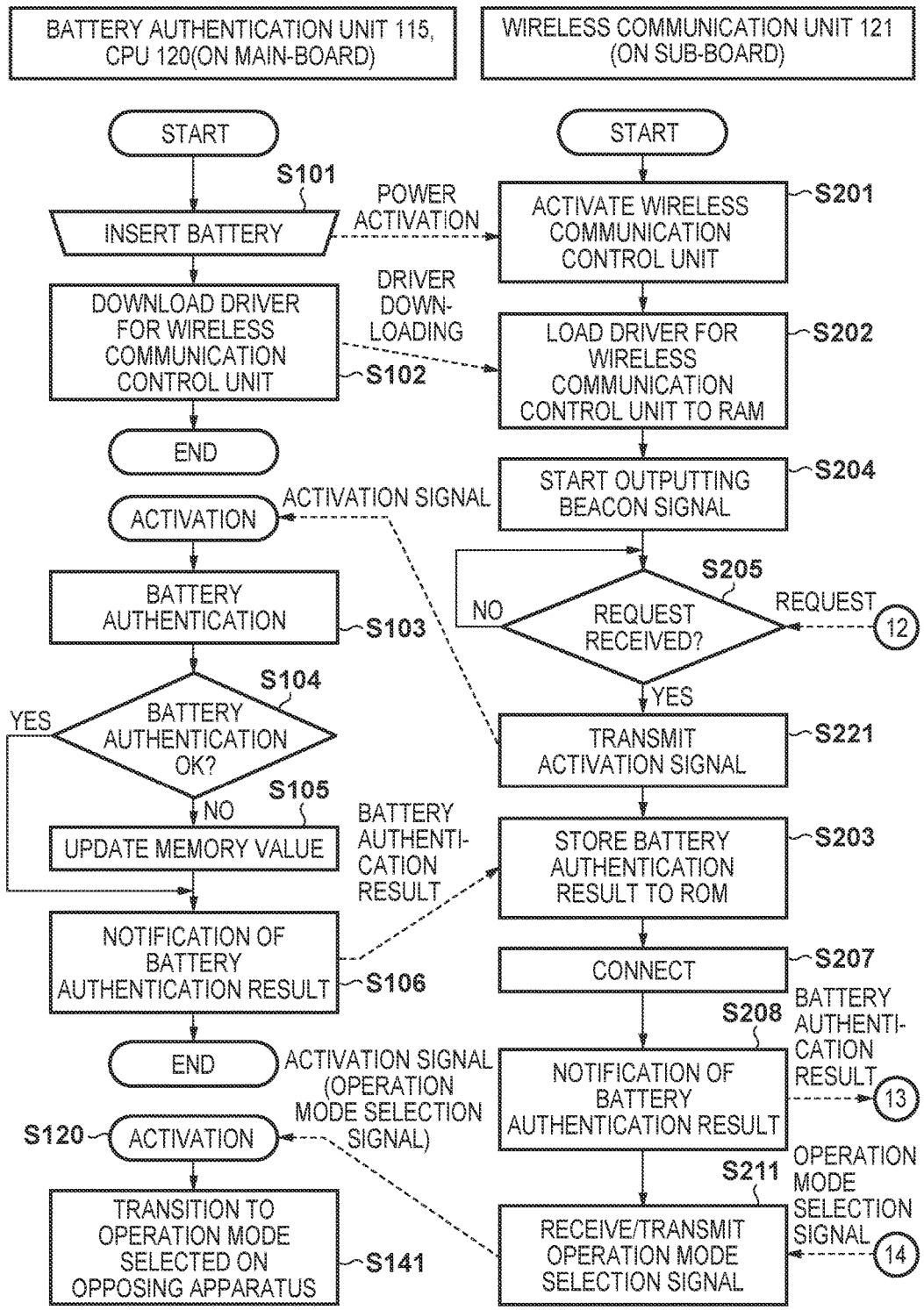
FIG. 10 is a flowchart illustrating operations of an imaging apparatus according to a fourth embodiment.

Next, a description is given of the imaging apparatus 100 and the mobile terminal 300 according to the fourth embodiment. The basic configuration is the same as those of the first to third embodiments. In the fourth embodiment, as in the third embodiment, the operation to activate the CPU 120 of the imaging apparatus 100 is switched according to the operation mode selected on the mobile terminal 300, and thus an attempt is made to reduce the standby power of the imaging apparatus 100. In the third embodiment, the battery authentication is executed immediately after the battery is inserted. However, in the fourth embodiment, after the battery is inserted, the battery authentication is executed after the request signal from the mobile terminal 300, which is the opposing apparatus, is received. FIG. 10 is a flowchart illustrating operations of the imaging apparatus 100 according to the fourth embodiment. The operations of the mobile terminal 300 are the same as those in the second embodiment (FIG. 6D).

The user inserts the battery 118, which serves as the main battery, into the imaging apparatus 100. Upon the battery 118 being inserted, power is supplied from the battery 118 to both the main-board and the sub-board, the CPU 120 is activated, and also the wireless communication control unit 210 on the sub-board is activated in step S201. In step S102, the CPU 120 reads out a control program (a driver) for the wireless communication control unit 210 from the memory 124, and transmits the control program to the information control unit 212 in the wireless communication control unit 210 via the information control unit 191. Thereafter, the CPU 120 stops operating (enters the power OFF state), and waits until the CPU 120 is powered ON by receiving the activation signal from the wireless communication unit 121 or by the user operating the power button. In step S202, the wireless communication control unit 210 loads the control program received by the information control unit 212 to the RAM 214, and starts a wireless communication operation by executing the control program. Thereafter, the wireless communication control unit 210 starts outputting the beacon signal in step S204. According to the fourth embodiment, the battery authentication has not been executed at this time.

In the mobile terminal 300, which is the opposing apparatus, upon the user starting up an application for communication with the imaging apparatus 100, the CPU 320 activates the application in step S301. Upon the user making an instruction to start communication with the imaging apparatus 100, the CPU 320, in step S302, transmits the request signal for activating the imaging apparatus 100 to the imaging apparatus 100 via the wireless communication unit 321.

In the imaging apparatus 100, in step S205, the wireless communication unit 121 receives the request signal transmitted from the mobile terminal 300. Upon the wireless communication control unit 210 receiving the request signal, processing proceeds from step S205 to step S221. In step S221, the wireless communication control unit 210 transmits a signal for activating a system (the activation signal) to the information control unit 191 of the CPU 120 of the imaging apparatus 100 via the information control unit 212. Upon the information control unit 191 receiving the activation signal, the CPU 120 of the imaging apparatus 100 is activated, and the CPU 120 executes battery authentication, records the authentication result, and notifies the wireless communication unit 121 of the authentication result (steps S103 to S106). Thereafter, the CPU 120 stops operating again (power OFF). Upon receiving the battery authentication result, the information control unit 212 stores the received battery authentication result in the ROM 213 in step S203. The subsequent operations of the imaging apparatus 100 (steps S207, S208, S211, S120, and S141) and the subsequent operations of the mobile terminal 300 are the same as those in the third embodiment. Note that if the user turns ON the power by operating the power button before the CPU 120 receives the activation signal from the wireless communication unit 121, the CPU 120 is immediately activated, and processing in step S103 and the subsequent steps is executed, followed by execution of the operations according to steps S121 to S128 in the first embodiment (FIG. 3B).

As described above, in the fourth embodiment, as in the third embodiment, the operation to activate the CPU 120 is switched according to the operation mode selected on the mobile terminal 300, which is the opposing apparatus. Therefore, it is unnecessary for the CPU 120 of the imaging apparatus 100 to wait in the activated state until an operation mode is selected on the mobile terminal 300, and it is possible to reduce the standby power.

Fifth Embodiment

Figure 11B:
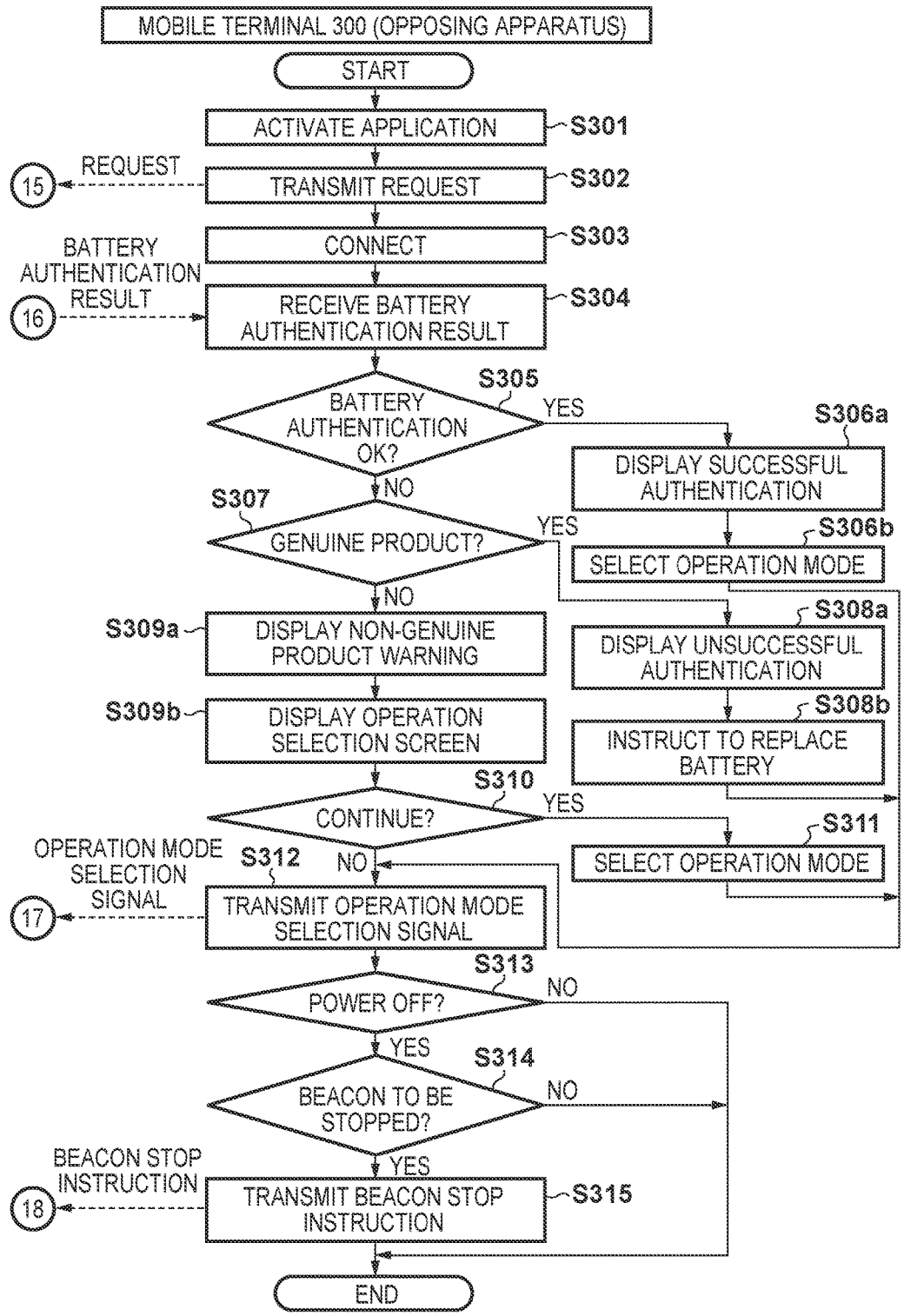
FIG. 11B is a flowchart illustrating operations of a mobile terminal according to the fifth embodiment.
Figure 12:
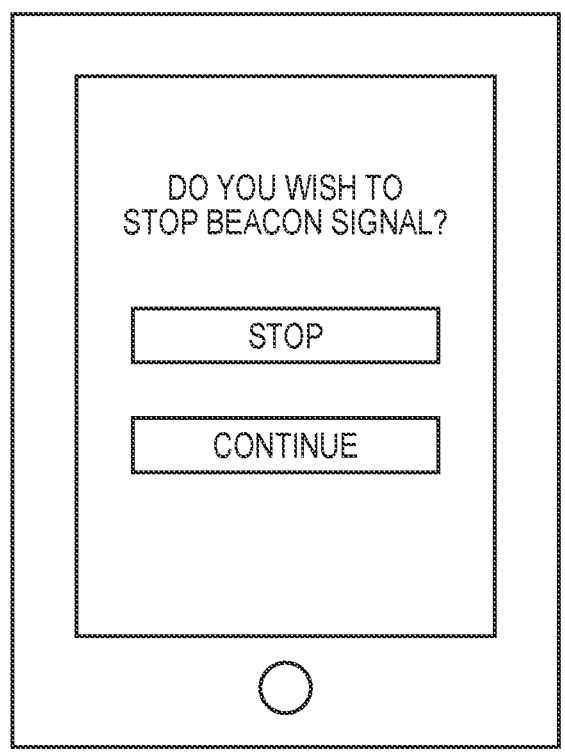
FIG. 12 is a diagram showing an example of content displayed by the mobile terminal according to the fifth embodiment.

Next, a description is given of the imaging apparatus 100 and the mobile terminal 300 according to the fifth embodiment. The basic configuration is the same as those of the first to fourth embodiments. In the fifth embodiment, as in the third and fourth embodiments, the standby power of the imaging apparatus 100 is reduced by switching the CPU activation operation according to the operation mode of the imaging apparatus 100 selected on the mobile terminal 300. In the fifth embodiment, power supply to the main-board and the sub-board is started upon detecting that a battery lid, which covers the battery 118, is closed. Also, in the fifth embodiment, it is possible to instruct the imaging apparatus 100 to stop outputting the beacon signal when "power OFF" is selected on the mobile terminal 300, and thus an attempt is made to further reduce the standby power of the imaging apparatus 100. FIG. 11A is a flowchart illustrating operations of the imaging apparatus 100 according to the fifth embodiment, and FIG. 11B is a flowchart illustrating operations of the mobile terminal 300 according to the fifth embodiment. FIG. 12 is a diagram showing an example of a screen displayed by the mobile terminal 300 according to the fifth embodiment.

In step S101, the user inserts the battery 118 into the imaging apparatus 100. In step S113, the battery lid detection unit 114 checks whether or not the battery lid has been closed. If the battery lid detection unit 114 confirms that the battery lid has been closed (YES in step S113), power is supplied from the battery 118, which serves as the main battery, to both the main-board and the sub-board. Note that the battery lid detection unit 114 can be realized as a switch that connects the battery 118 to a power line between the main-board and the battery 118 and to a power line between the sub-board and the battery 118 when the battery lid is closed. Upon the CPU 120 on the main-board being activated due to power being supplied to the main-board, steps S102 to S106 are executed. Steps S102 to S106 are the same as those in the first embodiment (FIG. 3A). Meanwhile, upon the wireless communication control unit 210 being activated in step S201 due to power being supplied to the sub-board, steps S202 to S211 are executed. Steps S202 to S211 are the same as those in the third embodiment (FIG. 8).

In the mobile terminal 300, which is the opposing apparatus, upon an application that has the function of communicating with the imaging apparatus 100 being activated, and receiving, from the user, an instruction to start communication, the mobile terminal 300 transmits the request signal to the imaging apparatus 100, and connects to the imaging apparatus 100. Thereafter, upon receiving a notification regarding the battery authentication result, the mobile terminal 300 displays a screen as shown in FIGS. 7A to 7F according to the battery authentication result thus received, and prompts the user to select an operation mode. The above-described processing is the processing shown in steps S301 to S312 of FIG. 11B, and is the same as that in the second embodiment (FIG. 6D).

The mobile terminal 300 in the fifth embodiment determines whether or not "power OFF" has been set to the operation mode selection signal in step S313. If "power OFF" has not been set, processing immediately ends. If "power OFF" has been set, processing proceeds to step S314. As described in the second embodiment above, cases in which "power OFF" is set as the operation mode selection signal are:

the case in which the battery authentication result indicates "genuine product and unsuccessful battery authentication"; and the case in which the battery is a non-genuine product and "power OFF" is selected as the operation mode.

In step S314, the CPU 320 displays a screen for prompting the user to select whether or not to stop the beacon signal from the imaging apparatus 100, on the display unit 322. FIG. 12 is an example of such a screen for prompting the user to select whether to stop or continue outputting the beacon signal. If the user selects to stop the beacon signal from the imaging apparatus 100 (YES in step S314), the CPU 320 transmits an instruction to stop the beacon signal to the wireless communication unit 121 of the imaging apparatus 100 via the wireless communication unit 321 in step S315. In the wireless communication unit 121 of the imaging apparatus 100, the wireless communication control unit 210 stops outputting the beacon signal upon receiving the instruction to stop the beacon signal from the mobile terminal 300 (step S231). On the other hand, if the user selects to continue to output the beacon signal on the screen shown in FIG. 12, processing immediately ends after step S314.

As described above, in the present embodiment, the standby power of the imaging apparatus 100 is reduced by switching the activation operation of the CPU 320 according to the operation mode of the imaging apparatus 100 selected on the opposing apparatus. Also, it is possible to stop the beacon signal from the wireless communication unit 121 if the battery authentication result indicates a non-genuine product, or if an instruction to power OFF the imaging apparatus 100 is given from the mobile terminal 300, or if the battery authentication result indicates a genuine product and the authentication failed. Therefore, it is possible to prevent the imaging apparatus 100 from transmitting an unnecessary beacon signal, and to further save power.

Other Embodiments

Although preferred embodiments of the invention have been described above, the invention is not limited to these embodiments, and various changes and modifications can be made within the scope of the spirit of the invention.

According to each of the embodiments above, the result of battery authentication in an electronic device can be checked on another electronic device that serves as the opposing apparatus in terms of wireless communication, and thus user convenience can be improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-164179, filed Aug. 21, 2015, which is hereby incorporated by reference herein in its entirety.

What is claimed is:

1. A communication apparatus that can be driven with a battery, comprising:
   an authentication unit arranged to authenticate a battery attached to the communication apparatus; and
   a wireless communication unit arranged to communicate with an external apparatus via a wireless network,
   wherein the wireless communication unit is arranged to transmit a result of authentication by the authentication unit to the external apparatus via the wireless network, and
   wherein the wireless communication unit is arranged to output a transition signal for causing the communication apparatus to transition from a first state which is a low power, consumption state to a second state in which power consumption is greater than in the first state, the first state being a state in which the wireless communication unit can communicate with the external apparatus.

2. The communication apparatus according to claim 1, wherein the wireless communication unit is arranged to transmit the result of authentication to the external apparatus when the communication apparatus in the first state.

3. The communication apparatus according to claim 1, wherein the wireless communication unit is arranged to output a signal for causing the communication apparatus to transition to the second state upon receiving a predetermined request from the external apparatus via the wireless network when the communication apparatus is in the first state.

4. The communication apparatus according to claim 1, wherein the authentication unit is arranged to authenticate the battery when the communication apparatus is in the second state, and is arranged to not authenticate the battery when the communication apparatus s in the first state.

5. The communication apparatus according to claim 1, wherein the authentication unit is arranged to authenticate the battery after causing the communication apparatus to transition to the second state, and provide the wireless communication unit with the result of authentication.

6. The communication apparatus according to claim 5, wherein the communication apparatus is arranged to transition to the first state after the authentication unit provides the wireless communication unit with the result of authentication.

7. The communication apparatus according to claim 6, wherein the wireless communication unit is arranged to transmit the result of authentication to the external apparatus after the authentication unit provides the wireless communication unit with the result of authentication and the communication apparatus transitions to the first state, without causing the communication apparatus to transition to the second state.

8. The communication apparatus according to claims 1, wherein the wireless communication unit is arranged, to output the transition signal upon receiving a predetermined signal from the external apparatus after trans pitting the result of authentication to the external apparatus when the communication apparatus is in the first state.

9. The communication apparatus according to claim 8, wherein the predetermined signal is a signal transmitted from the external apparatus after the external apparatus is notified of the result of authentication.

10. The communication apparatus according to claim 3, wherein the wireless communication unit is arranged to output a beacon signal when the communication apparatus is in the first state, and
the predetermined request is transmitted by the external apparatus that has receive the beacon signal.

11. A method for controlling a communication apparatus that can be driven with a battery and comprises a wireless communication unit arranged to communicate with an external apparatus via a wireless network, the method comprising:
- authenticating a battery attached to the communication apparatus;
- transmitting, by the wireless communication unit, a result of authentication to a external apparatus via the wireless network; and
- outputting, by the wireless communication unit, a transition signal for causing the communication apparatus to transition from a first state which is a low power consumption state to a second state in which power consumption is greater than in the first state, the first state being a state in which the wireless communication unit can communicate with the external apparatus.

12. A non-transitory computer readable storage medium storing a program for causing a computer of a communication apparatus that can be driven with a battery and comprises a wireless communication unit arranged to communicate with an external apparatus via a wireless network, to execute a control method, the control method comprising:
- authenticating a battery attached to the communication apparatus;
- transmitting by the ireless communication unit, a result of authentication to an external apparatus via a wireless network:, and
- outputting, by the wireless communication unit, a transition signal for causing the communication apparatus to transition from a first state which is a low power consumption state to a second state in which power consumption is greater than in the first state, the first state being a state in which the wireless communication unit can communicate with the external apparatus.

* * * * *